US010792762B1

(12) United States Patent
Gordin et al.

(10) Patent No.: US 10,792,762 B1
(45) Date of Patent: Oct. 6, 2020

(54) APPARATUS, METHOD, AND SYSTEM FOR LASER WELDING HEAT SINK FINS IN OUTDOOR LIGHTING FIXTURES

(71) Applicant: Musco Corporation, Oskaloosa, IA (US)

(72) Inventors: Myron Gordin, Oskaloosa, IA (US); David L. Barker, Ottumwa, IA (US); Paul M. Hagens, Muscatine, IA (US); Steven T. Heaton, Oskaloosa, IA (US); Kenneth G. Lewis, Jr., New Sharon, IA (US); Mark E. Thedens, Muscatine, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 16/709,981

(22) Filed: Dec. 11, 2019

Related U.S. Application Data

(62) Division of application No. 15/419,669, filed on Jan. 30, 2017, now Pat. No. 10,549,384.
(Continued)

(51) Int. Cl.

| | |
|---|---|
| ***B23K 26/21*** | (2014.01) |
| ***B23K 37/04*** | (2006.01) |
| ***B23K 26/70*** | (2014.01) |
| ***B23K 26/035*** | (2014.01) |
| ***F21V 29/74*** | (2015.01) |
| ***G05B 19/402*** | (2006.01) |

(Continued)

(52) U.S. Cl.
CPC ............ *B23K 26/21* (2015.10); *B23K 26/035* (2015.10); *B23K 26/702* (2015.10); *B23K 31/125* (2013.01); *B23K 37/04* (2013.01); *F21K 9/90* (2013.01); *F21V 29/74* (2015.01); *G05B 19/402* (2013.01); *F21Y 2115/10* (2016.08); *G05B 2219/45104* (2013.01); *G05B 2219/45138* (2013.01); *Y10S 901/42* (2013.01)

(58) Field of Classification Search
None
See application file for complete search history.

(56) References Cited

U.S. PATENT DOCUMENTS 8,926,139 B2 ‡ 1/2015 Reed .................. F21V 23/0478 315/117
9,103,605 B2 ‡ 8/2015 Mornet ................. F28F 13/003
(Continued)

OTHER PUBLICATIONS

L. Abbaschian and M. Delima, "Cracking Susceptibility of Aluminum Alloys During Laser Welding", Materials Research Ibero-American Journal of Materials, Apr. 2003, 273-278, vol. 6—No. 2.
(Continued)

*Primary Examiner* — Ashok Patel
(74) *Attorney, Agent, or Firm* — Jessica R. Boer

(57) ABSTRACT

Disclosed herein are apparatus, methods, and techniques directed to the manufacturing of heat sinks; specifically the forming of heat sink fins which are joined to a base or substrate so to collectively form a heat sink. Said methods permit full penetration at weld joints between said heat sink fins and said base, and said apparatus permit implementation of improved heat sink manufacturing in a production setting; specifically, in the production of LED lighting fixtures.

9 Claims, 22 Drawing Sheets

Related U.S. Application Data

(60) Provisional application No. 62/289,721, filed on Feb. 1, 2016.

(51) Int. Cl.

| | |
|---|---|
| ***B23K 31/12*** | (2006.01) |
| ***F21K 9/90*** | (2016.01) |
| *F21Y 115/10* | (2016.01) |

(56) References Cited

U.S. PATENT DOCUMENTS

| | | | | |
|---|---|---|---|---|
| 9,233,438 | B2 | 1/2016 | Phelan et al. | |
| 2005/0030754 | A1 ‡ | 2/2005 | Licht | H05K 3/326<br>362/433 |
| 2013/0250556 | A1 | 9/2013 | Gordin et al. | |
| 2014/0092593 | A1 | 4/2014 | Gordin et al. | |
| 2014/0268768 | A1 * | 9/2014 | Holland | F21K 9/20<br>362/249.02 |
| 2016/0320004 | A1 ‡ | 11/2016 | Tudorica | F21V 29/76 |
| 2017/0268762 | A1 ‡ | 9/2017 | Kathawate | F21V 29/74 |
| 2018/0085977 | A1 ‡ | 3/2018 | Ezaki | B32B 15/08 |

OTHER PUBLICATIONS

L. Pinto, "Laser welding of dissimilar aluminum alloys with filler material", Technical University of Lisbon-Portugal, Sep. 2008.

* cited by examiner
‡ imported from a related application

| | | |
|---|---|---|
| Single Module Prototype Testing<br>1 Mod, 4 Row, 1x5 XP-L V5<br>30° Aiming | **Fin Attachment Method** | |
| | Fin Height (in) | |
| | Fin Width (in) | |
| | Fin Length (in) | |
| | **Fin Quantity** | |
| | Fin Spacing (C-C) (in) | |
| | Fin Material | |
| | Base Width (in) | |
| | Base Length (in) | |
| | Base Thickness (in) | |
| | Base Material | |
| | Test Number | |
| | Test Current | |
| 101 <External Ambient> (C) | | |
| 102 <Ts Bottom Row Center LED> (C) | | |
| 103 <Ts 2nd Row from Bottom Center LED> (C) | | |
| 104 <Ts 3rd Row from Bottom Center LED> (C) | | |
| 105 <Ts Top Row Center LED> (C) | | |
| 106 <Internal Ambient Next to Top Row LED> (C) | | |
| 107 <Back of Reflector Bottom of Top Cup> (C) | | |
| 108 <Back of Reflector Top of Third Cup> (C) | | |
| Fixture Current (Power Supply Reading) | | |
| Fixture Voltage (Power Supply Reading) | | |
| Fixture Wattage (W) | | |
| LED Voltage (V) | | |
| LED Power (W) | | |
| Max Ts (°C) @ 25°C Ambient | | |
| Max Tj (°C) @ 25°C Ambient | | |
| Lumens per LED (per Cree PCT at max Tj) | | |
| Fixture Lumens (per Cree PCT at max Tj) | | |
| Efficacy (lm/W) | | |
| Fixture Properties at Junction Temperature | Fixture Current (A) | |
| | Fixture Voltage (V) | |
| **80.0** | Fixture Wattage (W) | |
| | Fixture Lumen Output (LM) | |

| | |
|---|---|
| LED | XP-L V5 |
| LED Thermal Resistance | 2.2 |
| LED Temp Coef. of Voltage (V/°C) | 0.002 |
| Module Quantity | 1 |
| Reflector Qty per Module | 4 |
| LEDs per Reflector | 5 |
| LED Fixture Quantity | 20 |
| Side Visors | No |
| Top Visor | No |
| Glass Type | Plain |

Figure 10A

| Press-In (3/8" overlap) | | Press-In (3/8" overlap) | | Press-In (1/4" overlap) | |
|---|---|---|---|---|---|
| 5 | | 5 | | 8 | |
| 0.08 | | 0.08 | | 0.08 | |
| 14 | | 14 | | 14 | |
| **7** | | **7** | | **8** | |
| 9/16 | | 9/16 | | 1/2 | |
| 1100 | | 1100 | | 1100 | |
| 4 | | 4 | | 4 | |
| 14 | | 14 | | 14 | |
| 0.5 | | 0.5 | | 0.5 | |
| 6061 | | 6061 | | 6063 | |
| TLab0260 | TLab0261 | TLab0262 | TLab0263 | TLab0267 | TLab0268 |
| 1.6A | 1.8A | 1.6A | 1.8A | 1.6A | 1.8A |
| 25.0 | 25.0 | 25.0 | 25.0 | 25.0 | 25.0 |
| 63.4 | 68.4 | 62.2 | 67.7 | 56.8 | 61.4 |
| 64.2 | 69.2 | 63.6 | 68.9 | 58.6 | 63.7 |
| 62.7 | 67.6 | 62.3 | 67.4 | 56.6 | 61.4 |
| 62.5 | 67.3 | 62.2 | 67.2 | 56.6 | 61.3 |
| 49.9 | 52.4 | 50.4 | 53.2 | 45.7 | 48.2 |
| - | - | 121.7 | 129.7 | 117.7 | 125.6 |
| - | - | 112.0 | 119.5 | 108.1 | 115.3 |
| 1.60 | 1.80 | 1.60 | 1.80 | 1.60 | 1.80 |
| 62.4 | 63.1 | 62.5 | 63.1 | 63.0 | 63.7 |
| 100 | 114 | 100 | 114 | 101 | 115 |
| 3.120 | 3.155 | 3.125 | 3.155 | 3.150 | 3.185 |
| 4.992 | 5.679 | 5.000 | 5.679 | 5.040 | 5.733 |
| 64.2 | 69.2 | 63.6 | 68.9 | 58.6 | 63.7 |
| 75.2 | 81.7 | 74.6 | 81.4 | 69.7 | 76.3 |
| 667.5 | 721.4 | 668.4 | 721.8 | 675.7 | 730.2 |
| 13,350 | 14,428 | 13,367 | 14,437 | 13,515 | 14,605 |
| 134 | 127 | 134 | 127 | 134 | 127 |
| 1.748 | | 1.758 | | 1.912 | |
| 62 | | 62 | | 63 | |
| 109 | | 110 | | 121 | |
| 14,154 | | 14,218 | | 15,170 | |
| | | | | | |
| Bottom surface of top reflector cup was starting to discolor after these two tests. | | Top surface of 3rd cup had hazy spot at beginning of test (new - out of box)<br><br>No changes in reflector appearance after tests. | | | |

Figure 10B

| MIG Weld-Fin | | Laser Weld-Fin | | MIG Weld-Fin | |
|---|---|---|---|---|---|
| 8 | | 8 | | 8 | |
| 0.08 | | 0.08 | | 0.08 | |
| 14 | | 14 | | 14 | |
| 8 | | 9 | | 9 | |
| 1/2 | | 7/16 (~0.42) | | 7/16 (~0.42) | |
| 1100 | | 1100 | | 1100 | |
| 4 | | 4 | | 4 | |
| 14 | | 14 | | 14 | |
| 0.5 | | 0.5 | | 0.5 | |
| 6063 | | 6063 | | 6063 | |
| Tlab0392 | TLab0393 | Tlab0399 | TLab0400 | TLab0401 | TLab0402 |
| 1.6A | 1.8A | 1.6A | 1.8A | 1.6A | 1.8A |
| 25.0 | 25.0 | 25.0 | 25.0 | 25.0 | 25.0 |
| 59.1 | 63.6 | 59.8 | 64.5 | 60.5 | 64.8 |
| 61.1 | 66.0 | 61.5 | 66.6 | 61.7 | 66.4 |
| 59.5 | 64.2 | 60.1 | 65.0 | 60.1 | 64.6 |
| 59.3 | 63.9 | 60.2 | 65.1 | 60.6 | 65.0 |
| 45.3 | 47.5 | 46.5 | 49.0 | 46.5 | 48.7 |
| 120.3 | 128.0 | 120.8 | 128.7 | 121.2 | 128.6 |
| 111.5 | 118.7 | 112.4 | 119.9 | 109.9 | 116.4 |
| 1.60 | 1.80 | 1.60 | 1.80 | 1.60 | 1.80 |
| 63.0 | 63.7 | 62.9 | 63.6 | 62.9 | 63.7 |
| 101 | 115 | 101 | 114 | 101 | 115 |
| 3.150 | 3.185 | 3.145 | 3.180 | 3.145 | 3.185 |
| 5.040 | 5.733 | 5.032 | 5.724 | 5.032 | 5.733 |
| 61.1 | 66.0 | 61.5 | 66.6 | 61.7 | 66.4 |
| 72.2 | 78.6 | 72.6 | 79.2 | 72.8 | 79.0 |
| 672.0 | 726.5 | 671.4 | 725.6 | 671.1 | 725.8 |
| 13,439 | 14,529 | 13,428 | 14,511 | 13,422 | 14,516 |
| 133 | 127 | 133 | 127 | 133 | 127 |
| 1.844 | | 1.826 | | 1.832 | |
| 63 | | 63 | | 63 | |
| 116 | | 115 | | 115 | |
| 14,753 | | 14,641 | | 14,678 | |
| | | | | | |
| Fins were offset to one side of the heat sink. | | Fin spacing was not consistent. Center to center spacing varied 0.40 - 0.50 in. | | | |

Figure 10C

Detail A

Detail A

| | |
|---|---|
| Fin Orientation | Vertical |
| LED Type | XP-L HD |
| LED Array | 1x5 (228) |
| LED Current | 1.2A |

Notes:
The straight 0.08" fin has almost the same temperature results as the tapered 0.06" tip, 0.10" base fin.

| | |
|---|---|
| Fin Tip Width | 0.06 |
| Fin Base Width | 0.06 |
| Fin Length (in) | 10 |
| Fin Material | 6063-T6 |
| Base Length (in) | 12 |
| Base Width (in) | 25.75 |
| Base Thickness (in) | 0.7 |
| Base Material | 6061-T6 |

| Junction Temp | | Fin Height (in) | | | | | |
|---|---|---|---|---|---|---|---|
| Fin Qty | Spacing | 4 | 5 | 6 | 7 | 7.5 | 8 |
| 38 | 0.61" | 97.9 | 94.9 | 92.4 | 91.3 | 90.5 | 90.4 |
| 43 | 0.54" | 95.8 | 92.9 | 90.3 | 89.3 | 88.7 | 88.3 |
| 48 | 0.48" | 94.1 | 91.3 | 89.0 | 87.9 | 87.2 | 86.8 |
| 53 | 0.44" | 92.8 | 90.1 | 88.0 | 86.8 | 86.1 | 85.8 |

| | |
|---|---|
| Fin Tip Width | 0.08 |
| Fin Base Width | 0.08 |
| Fin Length (in) | 10 |
| Fin Material | 6063-T6 |
| Base Length (in) | 12 |
| Base Width (in) | 25.75 |
| Base Thickness (in) | 0.7 |
| Base Material | 6061-T6 |

| Junction Temp | | Fin Height (in) | | | | | |
|---|---|---|---|---|---|---|---|
| Fin Qty | Spacing | 4 | 5 | 6 | 7 | 7.5 | 8 |
| 38 | 0.61" | 96.7 | 93.5 | 90.8 | 89.4 | 88.6 | 88.2 |
| 43 | 0.54" | 94.8 | 91.7 | 89.2 | 87.8 | 87.0 | 86.1 |
| 48 | 0.48" | 93.3 | 90.2 | 87.8 | 86.5 | 85.8 | 85.3 |
| 53 | 0.44" | 92.5 | 89.6 | 87.2 | 85.9 | 85.2 | 84.8 |

| | |
|---|---|
| Fin Tip Width | 0.08 |
| Fin Base Width | 0.125 |
| Fin Length (in) | 10 |
| Fin Material | 6063-T6 |
| Base Length (in) | 12 |
| Base Width (in) | 25.75 |
| Base Thickness (in) | 0.7 |
| Base Material | 6061-T6 |

| Junction Temp | | Fin Height (in) | | | | | |
|---|---|---|---|---|---|---|---|
| Fin Qty | Spacing | 4 | 5 | 6 | 7 | 7.5 | 8 |
| 38 | 0.61" | 95.9 | 92.5 | 89.7 | 88.2 | 87.3 | 86.8 |
| 43 | 0.54" | 94.3 | 90.8 | 88.2 | 86.4 | 85.9 | 85.4 |
| 48 | 0.48" | 93.1 | 89.8 | 87.3 | 85.9 | 85.1 | 84.7 |
| 53 | 0.44" | 92.6 | 89.5 | 87.1 | 85.6 | 84.8 | 84.3 |

| | |
|---|---|
| Fin Tip Width | 0.06 |
| Fin Base Width | 0.1 |
| Fin Length (in) | 10 |
| Fin Material | 6063-T6 |
| Base Length (in) | 12 |
| Base Width (in) | 25.75 |
| Base Thickness (in) | 0.7 |
| Base Material | 6061-T6 |

| Junction Temp | | Fin Height (in) | | | | | |
|---|---|---|---|---|---|---|---|
| Fin Qty | Spacing | 4 | 5 | 6 | 7 | 7.5 | 8 |
| 38 | 0.61" | 96.7 | 93.5 | 90.7 | 89.3 | 88.6 | 88.2 |
| 43 | 0.54" | 94.8 | 91.6 | 89.1 | 87.7 | 87.1 | 86.6 |
| 48 | 0.48" | 93.3 | 90.3 | 87.9 | 86.6 | 85.8 | 85.4 |
| 53 | 0.44" | 92.4 | 89.6 | 87.2 | 85.9 | 85.2 | 84.8 |

Figure 14A

| Fixture Weight (lb) | | Fin Height (in) | | | | | |
|---|---|---|---|---|---|---|---|
| Fin Qty | Spacing | 4 | 5 | 6 | 7 | 7.5 | 8 |
| 38 | 0.61" | 30.8 | 33.0 | 35.3 | 37.6 | 38.7 | 39.9 |
| 43 | 0.54" | 32.0 | 34.5 | 37.1 | 39.7 | 41.0 | 42.3 |
| 48 | 0.48" | 33.2 | 36.0 | 38.9 | 41.8 | 43.2 | 44.7 |
| 53 | 0.44" | 34.4 | 37.5 | 40.7 | 43.9 | 45.5 | 47.1 |

| Fixture Weight (lb) | | Fin Height (in) | | | | | |
|---|---|---|---|---|---|---|---|
| Fin Qty | Spacing | 4 | 5 | 6 | 7 | 7.5 | 8 |
| 38 | 0.61" | 33.8 | 36.8 | 39.9 | 42.9 | 44.4 | 46.0 |
| 43 | 0.54" | 35.4 | 38.8 | 42.3 | 45.7 | 47.4 | 49.2 |
| 48 | 0.48" | 37.0 | 40.8 | 44.7 | 48.5 | 50.4 | 52.4 |
| 53 | 0.44" | 38.6 | 42.8 | 47.1 | 51.3 | 53.4 | 55.6 |

| Fixture Weight (lb) | | Fin Height (in) | | | | | |
|---|---|---|---|---|---|---|---|
| Fin Qty | Spacing | 4 | 5 | 6 | 7 | 7.5 | 8 |
| 38 | 0.61" | 37.2 | 41.1 | 45.0 | 48.9 | 50.8 | 52.8 |
| 43 | 0.54" | 39.3 | 43.7 | 48.1 | 52.5 | 54.7 | 56.9 |
| 48 | 0.48" | 41.3 | 46.2 | 51.2 | 56.1 | 58.5 | 61.0 |
| 53 | 0.44" | 43.4 | 48.8 | 54.2 | 59.7 | 62.4 | 65.1 |

| Fixture Weight (lb) | | Fin Height (in) | | | | | |
|---|---|---|---|---|---|---|---|
| Fin Qty | Spacing | 4 | 5 | 6 | 7 | 7.5 | 8 |
| 38 | 0.61" | 33.8 | 36.8 | 39.9 | 42.9 | 44.4 | 46.0 |
| 43 | 0.54" | 35.4 | 38.8 | 42.3 | 45.7 | 47.4 | 49.2 |
| 48 | 0.48" | 37.0 | 40.8 | 44.7 | 48.5 | 50.4 | 52.4 |
| 53 | 0.44" | 38.6 | 42.8 | 47.1 | 51.3 | 53.4 | 55.6 |

Figure 14B

| Fin Tip Width | 0.08 | Fins Vertical | Base Material | Fin Material | | | | |
|---|---|---|---|---|---|---|---|---|
| Fin Base Width | 0.08 | | | 5052 | 6061 | 6063 | 1100 | 1060 |
| Fin Length (in) | 10 | | 5052 | 87.69 | 86.60 | 85.68 | 85.24 | 85.03 |
| Base Length (in) | 12 | | 6061 | 86.70 | 85.66 | 84.78 | 84.34 | 84.11 |
| Base Width (in) | 25.75 | | 6063 | 85.89 | 84.86 | 84.02 | 83.59 | 83.40 |
| Base Thickness (in) | 0.7 | | 1060 | 85.28 | 84.29 | 83.46 | 83.06 | 82.88 |

| Material Properties | Thermal Conductivity | Specific Heat | | | Density | |
|---|---|---|---|---|---|---|
| | k | c | | | p | |
| | (W/mK) | J/gC | BTU/lbF | BTU/lbF - Qfin | g/cc | lbm/ft$^3$ |
| 413 Diecast | 121 | 0.963 | 0.23 | 0.23 | 2.66 | 166.1 |
| 5052-H32 | 138 | 0.880 | 0.21 | 0.23 | 2.68 | 167.3 |
| A356-T61 | 151 | 0.963 | 0.23 | 0.23 | 2.67 | 166.8 |
| 6061-T6 | 167 | 0.896 | 0.214 | 0.301 | 2.7 | 168.6 |
| 6063-T6 | 200 | 0.900 | 0.215 | - | 2.7 | 168.6 |
| 1100-H14 | 220 | 0.904 | 0.216 | 0.216 | 2.71 | 169.2 |
| 1060-H16 | 230 | 0.900 | 0.215 | - | 2.705 | 168.9 |
| Copper | 385 | 0.385 | 0.092 | 0.091 | 8.9 | 555.6 |

Figure 14D

APPARATUS, METHOD, AND SYSTEM FOR LASER WELDING HEAT SINK FINS IN OUTDOOR LIGHTING FIXTURES

CROSS-REFERENCE TO RELATED APPLICATIONS

This application is a divisional application of U.S. application Ser. No. 15/419,669 filed Jan. 30, 2017 which claims the benefit of provisional U.S. Application Ser. No. 62/289,721, filed Feb. 1, 2016, which are hereby incorporated by reference in their entireties.

BACKGROUND OF THE INVENTION

The present invention generally relates to apparatus and methods of producing heat sinks for lighting fixtures having temperature-sensitive components such as LEDs; particularly outdoor lighting fixtures or lighting fixtures in corrosive environments. More specifically, the present invention relates to apparatus and methods of producing, in a rapid, consistent, and cost-effective manner, LED lighting fixtures with a plurality of high aspect ratio heat sink fins—where "aspect ratio" refers to the ratio of fin height to the spacing between the midpoint of two adjacent fins—in a manner that produces full penetration at the weld joint.

In the current state of the art in lighting design, there is a push to move away from more traditional light sources in favor of light-emitting diodes (LEDs). LEDs offer instant on-off capability and no hazardous materials (unlike some metal halide sources), pose no threat of UV or IR exposure (unlike some fluorescent sources), have excellent color rendering (unlike some low pressure sodium sources), and can achieve long operating life (unlike some incandescent sources). LEDs can assume a number of sizes, shapes, components, and configurations, but generally speaking an "LED" refers to the combination of a substrate, an emitter (also referred to as a die or a chip), a phosphor, and a primary lens (also referred to as a primary optic). More generally, LEDs have an emitting side that emits light that has been filtered (via the phosphor) and at least preliminarily shaped (via the primary lens); LEDs have a thermal transfer side which dissipates heat away from the temperature-sensitive components of the LED (e.g., primary lens, phosphor, junction between electrical power means and the die); and the two are on generally opposite sides of the LED, and are generally equally important in realizing the assumed benefits of LEDs.

When lighting design seeks to integrate LEDs in high demand applications such as sports lighting—namely, applications that require driving LEDs near or past their manufacturer-recommended operating conditions to achieve a total light output, a number of operating hours, a target junction temperature, and/or to offset the high capital cost of LEDs versus traditional sources—a number of steps may need to be taken on both sides of the LED. On the emitting side of the LED it is not uncommon to have secondary and tertiary reflectors, lenses, visors, baffles, louvers, or filters (collectively "optics") to ensure precise beam control, minimize glare, and maximize efficiency (both in transmission and in beam utilization). On the thermal transfer side it is not uncommon to have passive and active cooling techniques to ensure a desired efficacy (i.e., a desired luminous output (lm) for a given power input (W)); or, taking a different approach, to ensure junction temperature of the LED does not exceed some critical temperature—where "critical" is determined empirically, from explicit testing, by the manufacturer, or otherwise. Another provision made (primarily on the thermal transfer side, though optics could play a role) when integrating LEDs in any lighting design—and particularly when integrating LEDs into a high demand lighting application—is a suitable heat sink. Suitability of an LED heat sink, and methods of forming such, present challenges in the current art of LED lighting design; some such challenges are presently discussed.

First and foremost, a relatively uninterrupted thermal transfer path (also referred to as a thermal dissipation path) must exist from the thermal transfer side of the LED to the exterior of the lighting fixture housing the LED or to some other location (e.g., forced air conduit system, internal void elsewhere in the fixture) for a heat sink to be suitable—this is common knowledge. To that end it is not uncommon for fixture design to include a number of thermally conductive components in physical contact with the LEDs, and with each other. An LED may be mounted to a board, the board may be mounted to an aluminum substrate, the aluminum substrate may be mounted to an aluminum housing, and the aluminum housing may include or be affixed to a number of heat sink fins (e.g., to increase surface area of the heat sink). Other times the housing may be vented or aerodynamically designed so to permit beneficial wind flow—all examples of passive cooling techniques. More active techniques (e.g., forced fluid flow over components) are also possible. Sometimes alternative materials (e.g., silver substrates, sheet metal heat sink fins) are used.

Once an adequate thermal dissipation path is established for one or more operating conditions, a lighting designer is confronted with the challenge of how to produce the heat sink in a repeatable, consistent, and (preferably) cost-effective manner. Consider the above example where heat from an LED is drawn through a board, substrate, housing, and heat sink fins. Simply machining fins and housing collectively (i.e., integrally) from stock (e.g., 1000 series aluminum alloy) results in a final product on the order of 10% of the initial material—quite simply, a waste that is not economically sustainable. Extruding fins and housing collectively (i.e., integrally) from stock exceeds the tooling capacity (i.e., the pressure before tooling breakage) for known extrusion techniques for high aspect ratio fins (a limitation of around 15:1). A lighting designer must choose between lower aspect ratio heat sink fins—which may not result in a suitable heat sink—or may need to look at a simple housing to which heat sink fins are affixed. Of course, in the current state of the art, there are issues with the latter.

Traditional welding methods (e.g., metal inert gas (MIG) welding) do not result in full penetration; namely, do not fully bond a fin to the housing along the entire length of the fin though the entire thickness of the fin. A gap (even if only on order of a few thousandths of an inch) is present on the non-welded side of the fin, and can act as a focal point for crevice corrosion (or in cases of dissimilar metals, galvanic corrosion); a similar, but much larger, gap is at the end of each fin and presents a similar issue. Even when corrosion may not be an issue, said gap is unsightly, compromises the structural integrity of the fin (e.g., in high wind conditions), adversely impacts thermal transfer, and may interfere with other finishing steps (e.g., anodizing, painting). Attempts to fill the gap via soldering, brazing, or using some other method with filler material having adequate flow properties does not adequately seal the gap, or does so but with inadequate thermal transfer properties, too many additional or time-consuming steps to be economically feasible, or with inadequate structural properties. Fillet welds using heat sink fins with a machined knife edge in combination with a backer plate still result in the aforementioned gap—and in cases where spacing between heat sink fins is on the order of a fraction of an inch, is not possible. Attempts to join fins from the back side (i.e., the surface which would eventually bond to the base or substrate)—see, for example, U.S. Publication No. 2013/0175019—do not provide penetration through the entire thickness of the part on the weld side and does not address the gap between fins on the fin side.

Simply put, close spacing of heat sink fins is often necessary in high demand lighting applications, as are very tall heat sink fins, resulting in a high aspect ratio (e.g., on the order of or greater than 18:1); again, because the LEDs are being driven near or past some capacity and heat must be drawn away as quickly and effectively as possible. High aspect ratio heat sink fins either cannot be made at all using some traditional joining/forming methods, or cannot be made if one expects full penetration at the weld joint (i.e., between the fin and the housing/substrate along the entire length and thickness of the fin). Even in instances where full penetration is not required and one could use a traditional joining/forming method (e.g., MIG weld a heat fin to a housing), often tens (if not several tens) of heat sink fins are needed for each high demand LED lighting fixture. It is inconceivable even the most skilled welder could weld each fin consistently and rapidly over long periods as may be needed in a production setting. So it can be seen that while traditional forming and joining methods exist and could, in some circumstances, be used to bond many closely spaced, high aspect ratio heat sink fins to a substrate such as a fixture housing, doing so often results in a lack of penetration at the weld, is subject to incongruities, and is not cost-effective in high production (if even possible).

The need to manage thermal characteristics of LEDs—regardless of the motivation—is fervent and constant. While a number of lighting design techniques could be used, heat sinks are and will likely remain a primary feature of said techniques. While a complex and substantial heat sink may, on paper, provide a suitable thermal dissipation path, manufacturing a complex and substantial heat sink is another matter—particularly when one considers producing such consistently, rapidly, and cost effectively as is needed in a production setting. Lighting design is pushing the operating limits of LEDs, and is pushing the limits of state-of-the-art joining, forming, and manufacturing techniques associated with LED heat sinks—to the point that there appears to be no suitable options in the art that satisfies all the aforementioned needs. Thus, there is room for improvement in the art.

SUMMARY OF THE INVENTION

Operating LEDs in any sustainable and competitive fashion as compared to older lighting technology has always required a heat sink—whether it be a substrate upon which the LEDs are mounted, or that and also a complex thermal dissipation path that includes multiple components and multiple heat sink fins. For the latter scenario it is generally understood heat sink fins have to somehow be formed, and then somehow be joined to a component within the thermal dissipation path. As LEDs are driven harder and harder to satisfy lighting demands, heat sinks must become more and more effective; the result is heat sink fins are becoming taller (e.g., exceeding several inches) to increase surface area, and becoming thinner (e.g., less than one-tenth an inch) and more closely spaced together (e.g., less than one-half an inch) to include as many as possible in the thermal dissipation path without interrupting the flow of air (which also aids in thermal dissipation). Yet while LEDs are ever evolving and fixture design including heat sinks is ever evolving, forming and joining methods associated with manufacturing a fixture and/or associated heat sink have not evolved in kind.

It is therefore a principle object, feature, advantage, or aspect of the present invention to improve over the state of the art and/or address problems, issues, or deficiencies in the art.

Envisioned herein are improvements to constructing effective heat sinks for LEDs; specifically, improvements in the forming and/or joining of heat sink fins to a substrate which acts as part of a thermal dissipation path for one or more LEDs in a lighting fixture.

Further objects, features, advantages, or aspects of the present invention may include one or more of the following:

a. apparatus, methods, or techniques which permit a full penetration weld so to prevent moisture ingress, aid in preventing corrosion in outdoor or corrosive environments, or otherwise;
b. apparatus, methods, or techniques which permit rapid and consistent welds suitable for high aspect ratio heat sink fins to aid in manufacturing; and
c. apparatus, methods, or techniques which provide for welds which do not adversely impact thermal transfer so to preserve efficient thermal dissipation paths.

These and other objects, features, advantages, or aspects of the present invention will become more apparent with reference to the accompanying specification and claims.

BRIEF DESCRIPTION OF THE DRAWINGS

From time-to-time in this description reference will be taken to the drawings which are identified by figure number and are summarized below.

FIG. 6A illustrates a stamped fin, FIG. 6B illustrates a thick base fin, FIG. 6C illustrates a thin base fin, and FIG. 6D illustrates a press fit fin.

FIGS. 10A-C illustrate the full data set of Table 3 using various test setups described herein.

FIGS. 14A-E illustrate the full data set of Table 4 which illustrates the thermal impact of different aluminum alloys.

DETAILED DESCRIPTION OF EXEMPLARY EMBODIMENTS

A. Overview

Figure 1:
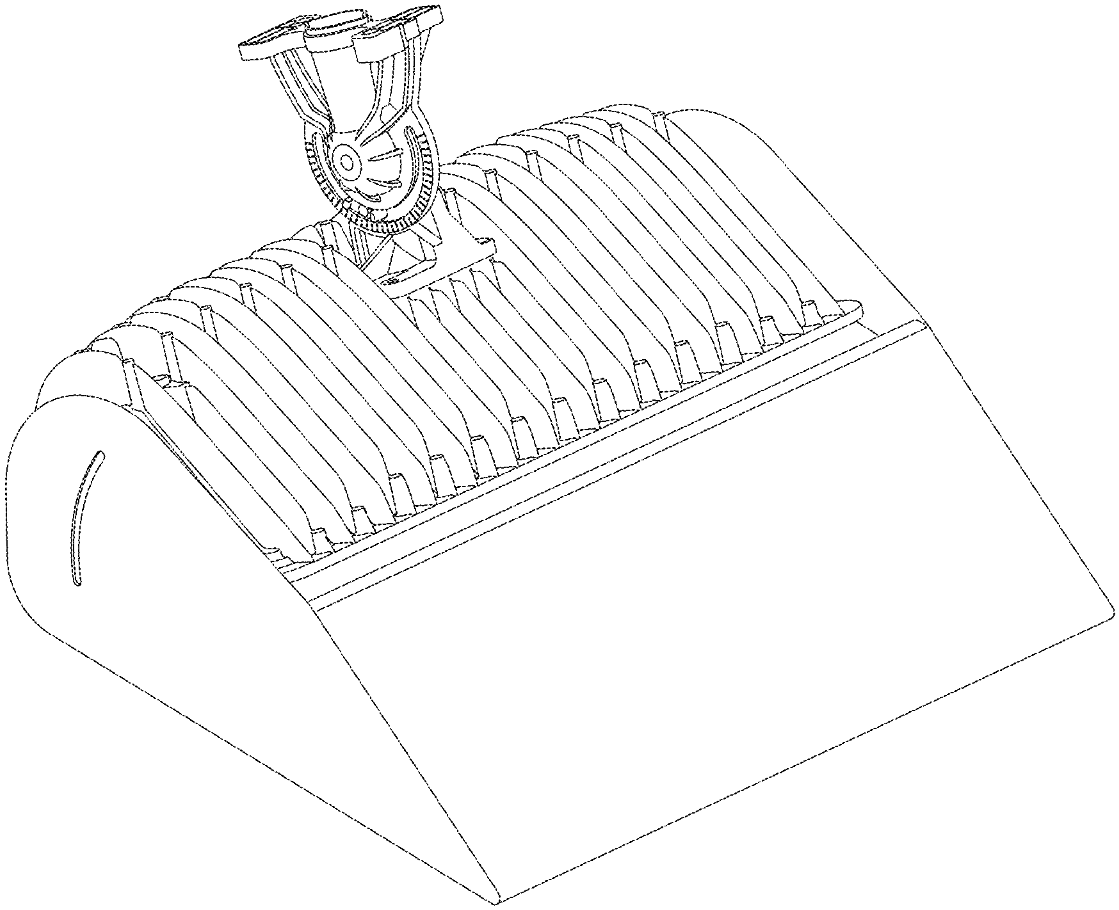
FIG. 1 illustrates a perspective view of a prior art LED lighting fixture formed by die casting.

To further an understanding of the present invention specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same parts throughout the drawings.

Regarding terminology, as previously stated the term "LED" refers to a combination of substrate, emitter, phosphor, and primary lens. When installed in a lighting fixture, the LED is aligned such that the emitting side of the LED is generally oriented towards the light-emitting side of the fixture, and the thermal transfer side of the LED is generally oriented towards the heat sink side of the lighting fixture. This is the extent to which the term "LED" is used herein; no distinction is made between a multi-die LED and a single die LED, an LED module (which includes optics) versus a "bare" LED, and the like. Likewise, no distinction is made between a lighting fixture which is a stand-alone fixture versus a sealed LED bulb or lamp which is retrofitted for use in a larger luminaire. The term "fixture" is used interchangeably herein with the term "luminaire". In essence, though the invention is directed to LED luminaires—particularly those in high demand lighting applications and/or those in outdoor or corrosive environments—aspects according to the present invention may present a benefit in the art of joining heat sink materials regardless of how LEDs are defined or how a fixture is defined, and could even benefit other fields not including LEDs or fixtures regardless of how they are defined (e.g., heat exchangers). The aforementioned terms are used merely for convenience and/or illustration, and should not be considered limiting.

Further regarding terminology, reference is given herein to "suitable" and "effective" LED heat sinks. While it is appreciated these terms are somewhat generic, in the context of the present invention they refer to suitable thermal transfer given a particular manufacturing/forming/joining apparatus/method/technique of heat sink for a particular set of operating conditions including, but not limited to, ambient temperature, case/solder point temperature, junction temperature, number and model of LED, fixture or LED current, fixture or LED voltage, manufacturer-suggested or actual efficacy, and the like. It is common knowledge that a heat sink designed for a particular fixture operating a particular type and number of LEDs at one set of operating conditions can be suitable, yet fail to be suitable when that same fixture operating the same LEDs operates said LEDs at a higher fixture power. Likewise, a heat sink may be effective using one method of joining fins to a substrate, yet not effective using a different method—as determined by thermal resistance at the joint, for example. In essence, though the invention is directed to manufacturing LED heat sinks via improvements to the forming or joining of heat sink fins to a substrate, aspects according to the present invention are not limited solely to the manufacturing/forming/joining methods or techniques disclosed herein—others are possible, and envisioned. Likewise, any inference made regarding the terms "effective" and "suitable" is made with respect to the data presented herein or referenced, which is not all-inclusive of all possible factors involved with manufacturing heat sinks.

Figure 2:
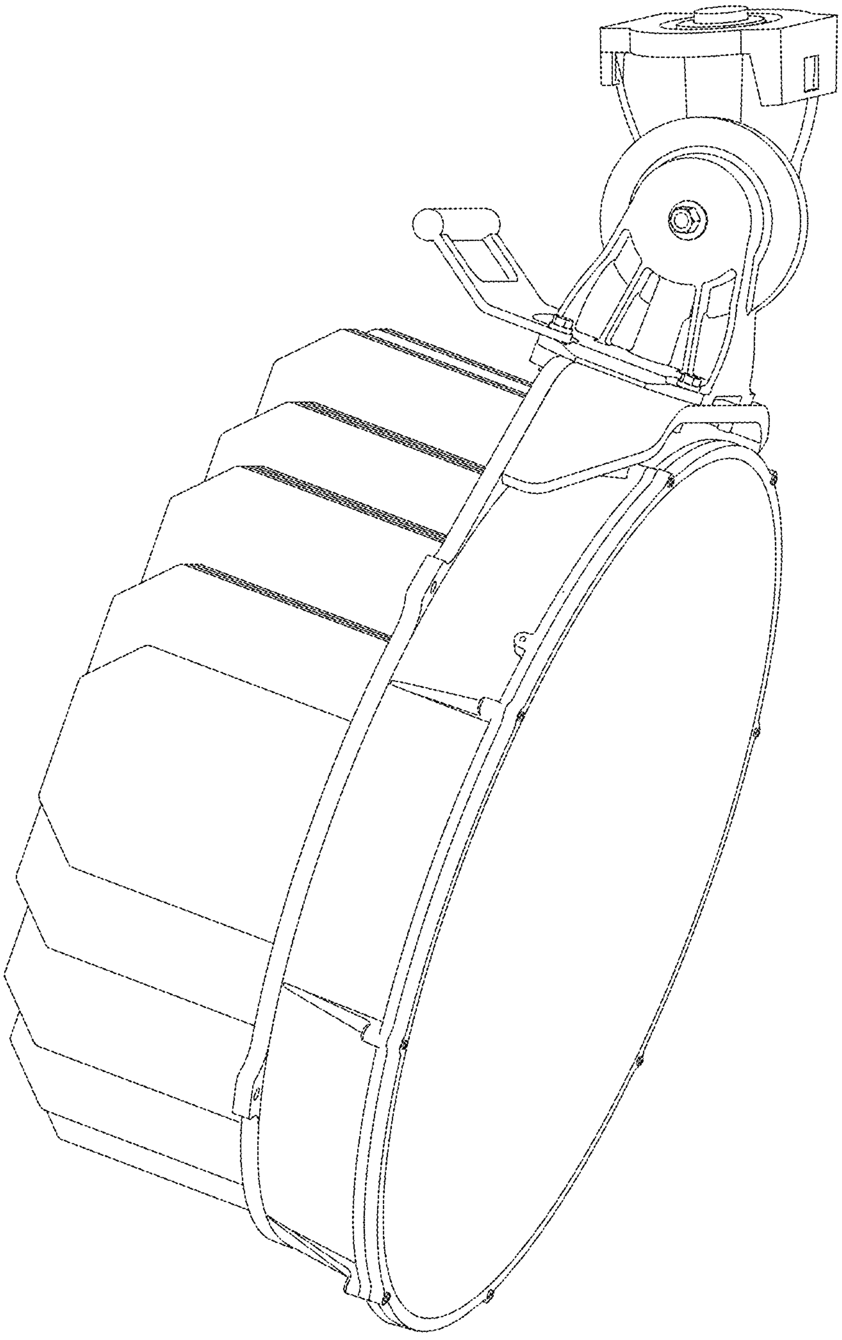
FIG. 2 illustrates a perspective view of a prior art LED lighting fixture wherein the heat sink fins are joined to a substrate using traditional welding methods.

The exemplary embodiments envision apparatus, methods, and techniques whereby heat sink fins may be joined to a substrate so to facilitate the rapid removal or redistribution of heat proximate a temperature-sensitive source; specifically, where heat sink fins act as part of an effective heat sink for one or more LEDs. For context, consider a prior art LED lighting fixture such as that illustrated in FIG. 1 and similar to that described in U.S. Patent Publication No. 2013/0250556 (issued as U.S. Pat. No. 9,631,795 on Apr. 25, 2017) incorporated by reference herein. The LED lighting fixture of FIG. 1 is die cast from an aluminum alloy (e.g., A413) and represents where the art of LED lighting design resides with respect to a lighting fixture which can be produced relatively rapidly, consistently, cost-effectively. FIG. 2 is an LED lighting fixture similar to that discussed in U.S. Patent Publication No. 2014/0092593 incorporated by reference herein. The LED lighting fixture of FIG. 2 is formed from a machined aluminum alloy body (e.g., Al 5052) with heat sink fins stamped from aluminum alloy (e.g., Al 1100) and hand MIG-welded to the machined body, and represents a new evolution in the art of LED lighting design. For a die cast LED lighting fixture such as that in FIG. 1, lead time on tooling and molds is typically 12-24 weeks (when including tool build time, first article/small production runs, etc.). Lead times on the order of several months do not keep pace with a lighting technology that is evolving rapidly year-upon-year for over a decade; see, for example, efficacy results and projections in the Solid-State Lighting R&D plan published yearly by the United States Department of Energy (see http://www.energy.gov/eere/ssl/downloads/solid-state-lighting-rd-plan website accessed 2016-01-13). For a hand MIG-welded LED lighting fixture such as that in FIG. 2, the bottleneck is both in the labor-intensive welding process and in the hard tooling (e.g., various vises or jigs that only accommodate parts of particular dimensions) which must be modified as fixtures are modified.

Figure 3:
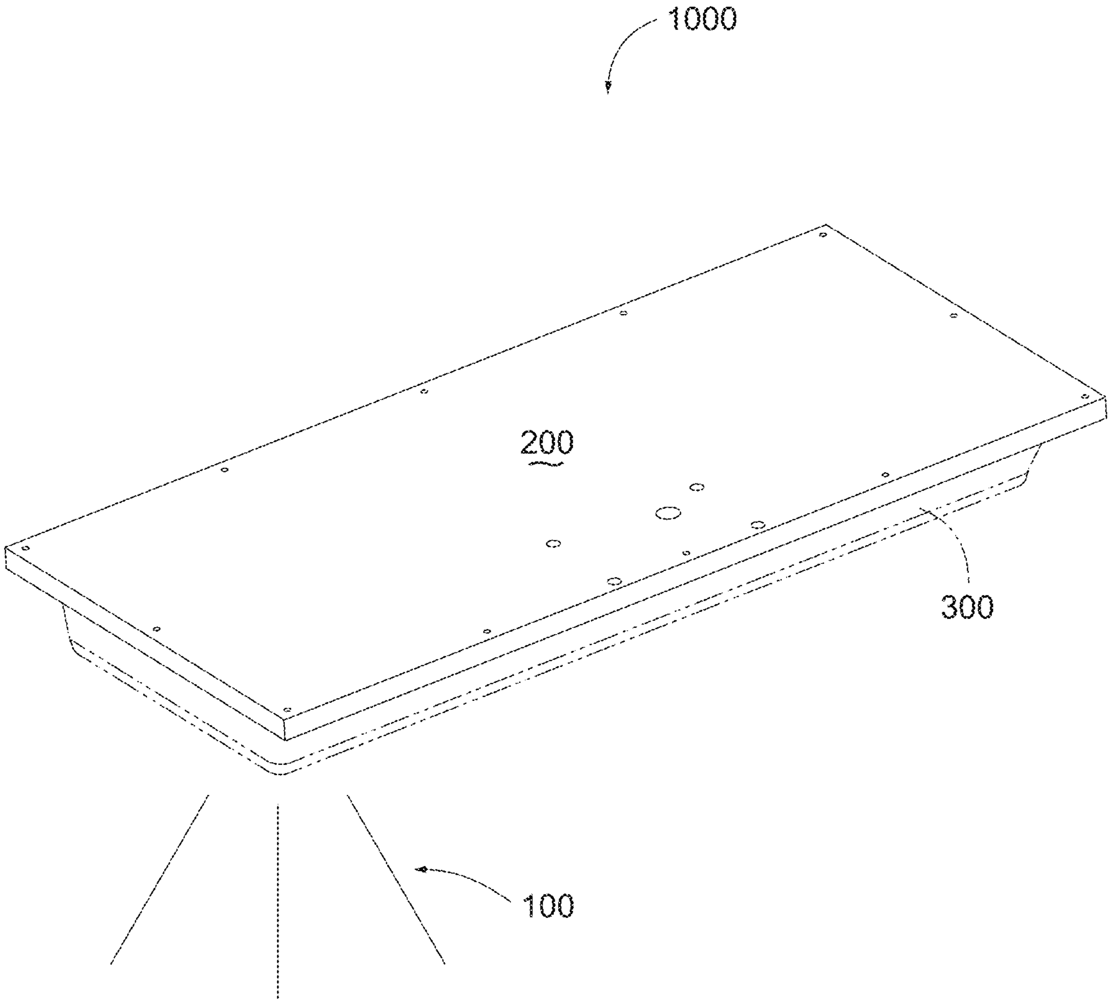
FIG. 3 illustrates a perspective view of a generic LED lighting fixture having a light-emitting side, a heat sink side, and a number of components therebetween.
Figure 4:
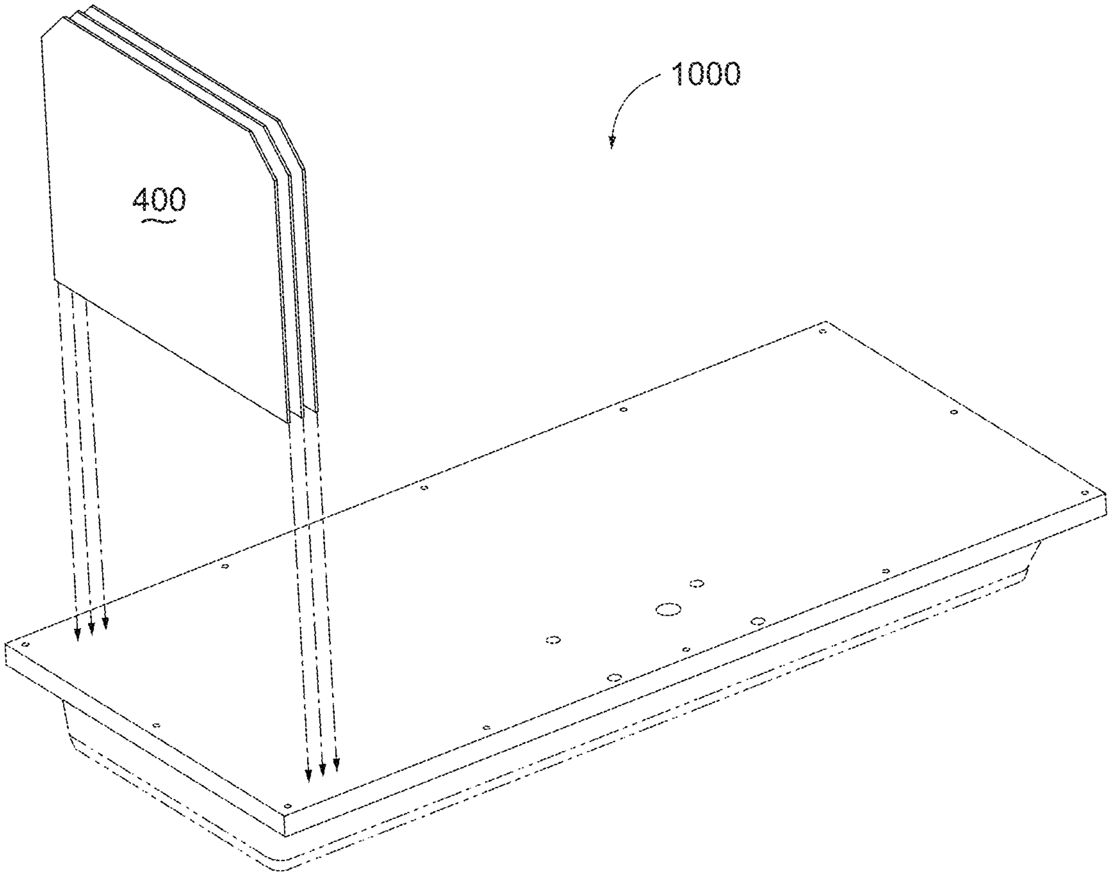
FIG. 4 illustrates generically the relative position and orientation of heat sink fins relative the generic LED lighting fixture of FIG. 3; note that for clarity only a few fins are included.
Figure 5:
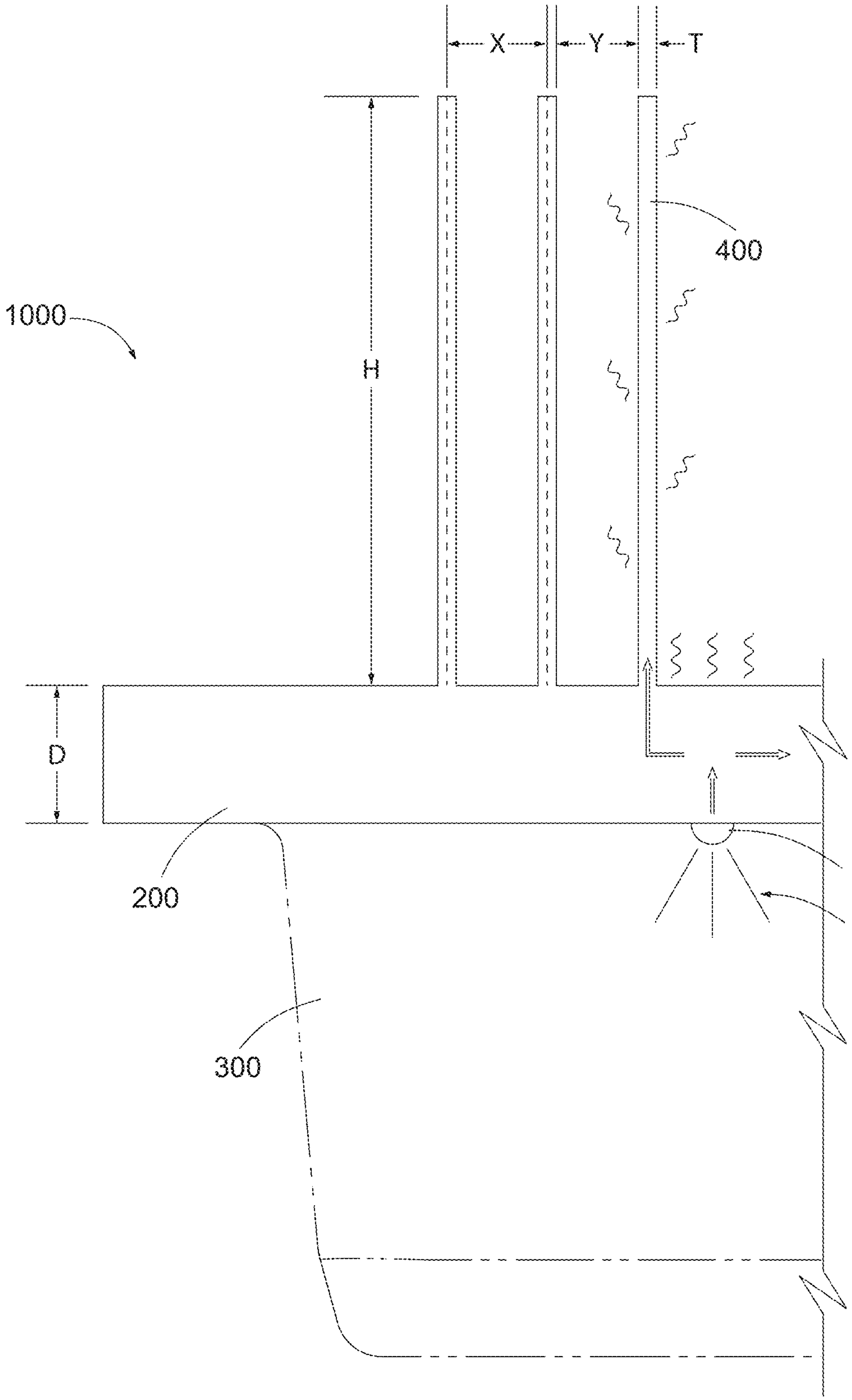
FIG. 5 illustrates an enlarged partial front view of FIG. 4 showing spacing of heat sink fins when finally joined to the heat sink side of the generic LED lighting fixture.

FIGS. 3-5 illustrate a generic LED lighting fixture 1000 according to aspects of the present invention. As can be seen from FIG. 3, LED lighting fixture 1000 generally comprises a heat sink side 200 as previously mentioned (note that heat sink fins have been omitted) and a light-emitting side 300 as previously mentioned (note that light is diagrammatically illustrated via directional lines 100). In practice, light-emitting side 300 may include a number of components such as a combination of light-transmissive material (e.g., glass lens) and thermally conductive housing (e.g., aluminum alloy) which collectively define an internal space, said internal space housing a number of LEDs, optics, on-board controls (e.g., driver controls), electrical connections, and the like. Light-emitting side 300 of LED lighting fixture 1000 might also include one or more external optics such as is illustrated in aforementioned U.S. Patent Publication No. 2013/0250556 (issued as U.S. Pat. No. 9,631,795 on Apr. 25, 2017), the fixture type of FIG. 1. Heat sink side 200 of LED fixture 1000 typically includes some number of heat sink fins 400 placed at regular intervals which are affixed to or otherwise in thermal communication with the outermost surface of heat sink 200; see FIG. 4. In practice, heat sink fins could be as illustrated in FIG. 4 or at some other orientation relative heat sink side 200; for example, orthogonal to that illustrated in FIG. 4 (i.e., running parallel to the longest dimension of the lighting fixture as opposed to transverse to the longest dimension of the lighting fixture). In an outdoor setting anticipated wind direction will likely inform fin direction; see aforementioned U.S. Patent Publication No. 2014/0092593 for further details.

FIG. 5 illustrates an enlarged partial front view of FIG. 4, and shows in greater detail the spacing of heat sink fins when joined, formed, or otherwise affixed to or put in thermal communication with heat sink side 200 of LED lighting fixture 1000. As can be seen, heat sink side 200 comprises a plate material having a thickness D and being machined, punched, or otherwise formed from a suitable thermally conductive alloy (e.g., Al 5052 or Al 6063). In practice thickness D will depend, at least in part, upon the number of LEDs 101 in thermal communication with heat sink side 200 of LED lighting fixture 1000. As can be seen from FIG. 5, heat generated at LED 101 is generally transferred through thickness D of heat sink side 200 up through heat sink fins 400 and out to the environment, the former diagrammatically illustrated via hollow arrows (i.e., conduction) and the latter diagrammatically illustrated by wavy lines (i.e., natural convection). In practice, a fan or other device could also be used so to, in essence, provide forced convection at or near the heat sink fins. It is also expected that some heat is generated at the emitting side of the LED in accordance with generating light 100 (i.e., radiation), though this is not the focus of the present invention.

Each heat fin 400 has a thickness T and a distance Y separating fins, the aspect ratio being defined by the height H relative to the midpoint spacing X (i.e., H:X). Modification of any of the aforementioned variables typically impacts the others. For example, making fins thicker—increasing T—will result in a reduction of distance Y for a given fixture size and number of fins. Decreasing distance Y may result in preventing certain joining techniques from being used; feeder or filler material might not fit in space Y, the weld zone might exceed spacing Y and result in sagging or warpage of the fins, etc. As another example, increasing spacing Y and reducing height H (e.g., to permit the use of traditional welding techniques on both sides of a fin to ensure full penetration) will either result in fewer or thinner fins for a given fixture—which will decrease the effectiveness of the heat sink. There are tradeoffs to be made regardless of the forming/joining technique used, but for high demand lighting applications with high aspect ratio heat sink fins, none of the tradeoff scenarios are particularly desirable.

Figure 6A:
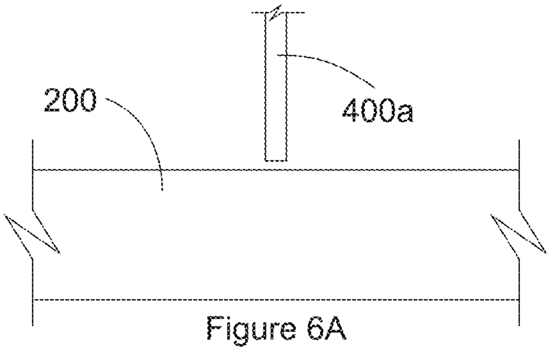
FIGS. 6A-D illustrate various forms a heat sink fin could take.
Figure 6B:
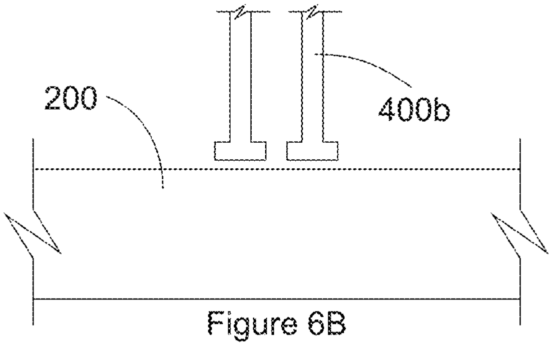
Figure 6C:
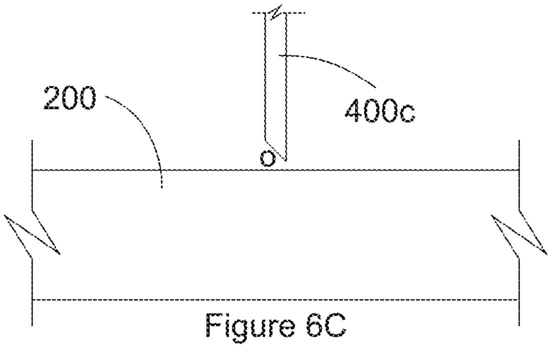
Figure 6D:
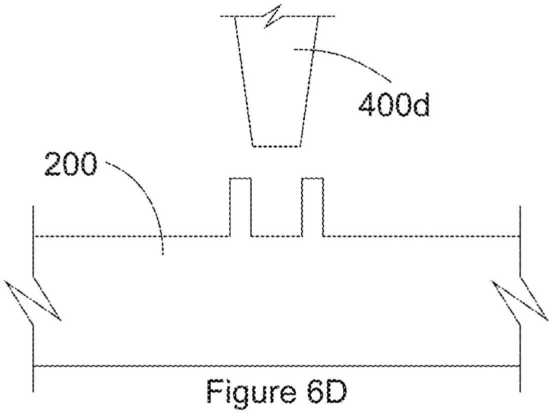
Figure 7A:
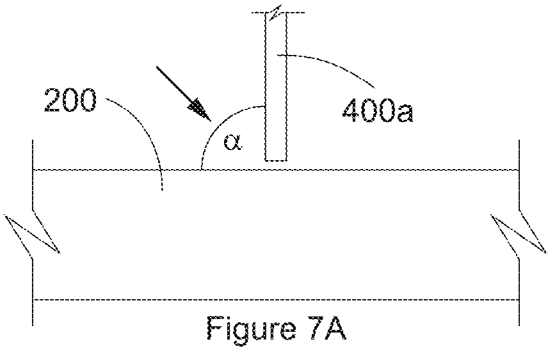
FIGS. 7A-D illustrate the various heat sink fins of FIGS. 6A-D including diagrammatic depictions of welding direction via arrows; note that the press fit of FIG. 7D does not include welding.
Figure 7B:
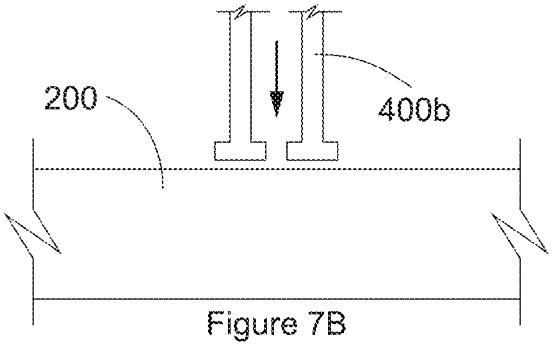
Figure 7C:
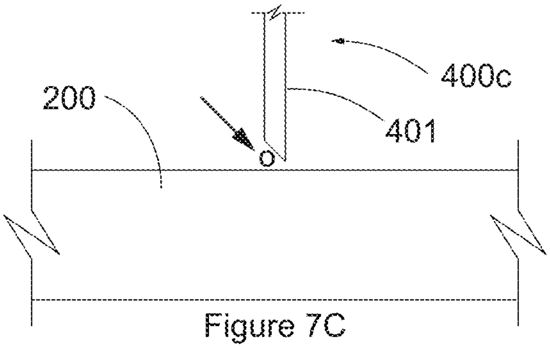
Figure 7D:
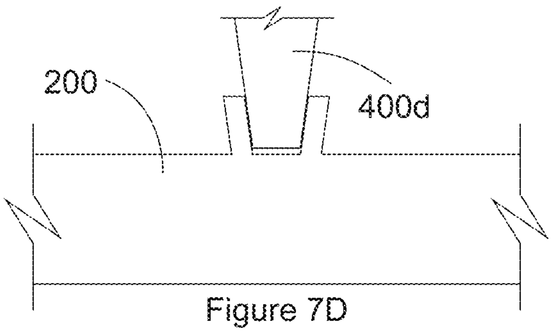

FIGS. 6A-D illustrate several different fin scenarios which were explored in accordance with the present invention. FIG. 6A illustrates a simple fin 400*a* which is welded to a plate representing the heat sink side of a lighting fixture. FIG. 6B illustrates a thick base fin 400*b* (i.e., an I-beam fin), and FIG. 6C illustrates a thin base fin 400*c* (i.e., a knife edge fin). Finally, FIG. 6D illustrates a tapered fin 400*d*; namely, a fin which is tapered (e.g., on the order of 1° or more along its length) and mechanically pressed into a gap between two protrusions (here on the order of ⅜" in height) thereby creating deflection of the protrusions and ensuring a snug fit. It should be noted that the degree of taper of the fin of FIG. 6D has been greatly exaggerated for purposes of illustration. FIGS. 7A-D illustrate (via arrow) the direction from which a welding device would be oriented relative the part; note that there is no arrow for the press fit fin. So for a simple fin-to-base weld (FIG. 7A) the electrode or other component of a welding tool would come in anywhere along the angle $\alpha$ so to create a weld at the faying surface (i.e., the 90° angle or T-joint formed by parts 400 and 200). Angle $\alpha$ is restricted by both the height H of heat sink fin 400*a* and the spacing Y between heat sink fins, and is the primary reason why welding techniques such as MIG welding and friction stir welding cannot typically be used. Traditional laser welding (i.e., with no feeder wire) cannot typically be used with the scenario in FIG. 7A because laser welding has shown time and time again to cause thermal cracking in highly thermally conductive aluminum alloys such as those used in LED lighting fixtures in high demand lighting applications when no feeder wire is present; see, for example, L. Abbaschian and M. de Lima, "Cracking Susceptibility of Aluminum Alloys During Laser Welding." *Materials Research*, vol. 6, No. 2, pp. 273-278, 2003 incorporated by reference herein, and L. Pinto, "Laser welding of dissimilar aluminum alloys with filler material." *Technical University of London,* 2008 incorporated by reference herein.

Modifying the fin to have a thicker base (FIG. 7B) permits a "head-on" weld (note the direction of the arrow relative part 200) which would possibly permit MIG welding, but only if spacing Y was large enough (which reduces the number of fins for a given fixture), and if the weld was consistently done; too slow a weld speed could cause warpage and too fast a weld speed could result in a decrease in thermal transfer and structural integrity at the weld joint. Further, if fins are formed by extrusion, height H becomes an issue insomuch that parts may become wavy or deformed, and could interfere with line-of-sight of the weld tool—particularly if a "wobble" or stitch weld is needed to fully join the parts—which could prevent both MIG and laser welding from being used. Taking a different approach by thinning the fin base to a knife edge (FIG. 7C) permits a fillet weld using a filler material (e.g., Al 4047) but the issue here is a lack of penetration—even with a backer plate on surface 401 of fin 400*c*—using traditional welding methods. Also, there is the issue of how to keep fins 400 abutting part 200 and perpendicular during welding. Most of the above issues are obviated with the press fit fin (FIG. 7D); note, again, that for purpose of illustration both the taper of the fin and the deflection of the protrusions are exaggerated. However, in outdoor or corrosive environments an end weld (i.e., a weld into the plane of the page of FIGS. 7A-D) to seal the air gap on either end would likely be required—and an end weld would likely require hard tooling not needed in FIGS. 7A-C. Also, there is a mismatch between tolerances achievable in a stamped fin versus a substrate with many protrusions (which would likely be extruded)—leading to inconsistencies from part to part.

So it can be seen by the general examples in FIGS. 7A-D there are a number of issues to be addressed to improve current practices in the area of joining heat sink fins to a substrate so to produce an effective heat sink for LED lighting fixtures in high demand lighting applications; namely, thermal transfer, consistency, rapidity, and flexibility.

Discussed first is the issue of thermal transfer; specifically, forming and/or joining methods, associated apparatus, and materials which can accommodate high aspect ratio heat sink fins, result in full penetration, and provide adequate structural integrity and thermal dissipation when acting as a heat sink for LED lighting fixtures in demanding, outdoor, and/or corrosive lighting applications. Discussed next is how to implement said joining methods, apparatus, and materials in a production setting so to ensure consistency, rapidity, flexibility, and (preferably) cost effectiveness.

When discussing adequate thermal dissipation as it relates to a heat sink for LED lighting, one could choose to define "adequate" in a number of ways; a minimum efficacy, a maximum fixture wattage, a minimum fixture light output (lumens), etc. could all be used as the threshold for what qualifies as an adequate heat sink. In practice, it has been found that a limiting factor is the junction temperature ($T_j$) of the LEDs themselves; this makes practical sense since $T_j$ is a fundamental LED measurement derived from solder point temperature ($T_s$), which is the focus of multiple lighting standards (see, e.g., IESNA LM-80 and IESNA TM-21). Initial experiments have shown that a junction temperature of approximately 80° C. is ideal for striking a balance between LED life, degradation of the optics, and luminous output. As such, the following data which highlights differences in forming/joining methods as well as aspect ratios of heat sink fins are centered on a target $T_j$ of 80° C.; though it is anticipated that in very high demand applications a junction temperature of up to 120° C. could be possible. Also, it should be noted a heat sink formed according to the present invention could be evaluated in a different manner and not depart from at least some aspects of the present invention.

Table 1 illustrates the difference between some of the forming/joining methods already discussed; Setup 1 is a die cast fixture similar to that illustrated in FIG. 1, Setup 2 is a predominately mechanical method of joining such as the press fit of FIG. 7D (though in this particular case a press fit was not available so the fin was bent in an "L" shape and bolted to the base with a typical thermal interface material interposed therebetween), and Setup 3 is a MIG welded fixture similar to that of FIG. 2. Each setup used a base 0.5" thick to which 288 LEDs were mounted (model XM-L2 available from Cree, Inc., Durham, N.C., USA). All dimensions are reported with respect to FIG. 5, $T_s$ is solder point temperature, and $T_j$ is junction temperature.

where Θ is the thermal resistance of the LED (° C./W) and P is the power to a single LED Table 1 highlights a few things. Firstly, when junction temperature increases efficacy decreases—this is to be expected, and indeed is seen in all test cases. However, fixture lumens increase—even if efficacy decreases. Whether a lighting designer chooses to optimize efficacy or fixture lumens will often hinge upon the economic limiting factor—higher fixture lumens might permit a designer to omit an entire fixture from the lighting design, but if the target area to be illuminated has strict color rendering requirements (e.g., for broadcasting) over a very long life (e.g., tens of thousands of hours), a lighting designer may opt for the higher efficacy (even if it means another fixture in the design). Secondly, it should be readily apparent that there is a limitation in casting high aspect ratio fins; note the small value of H for Setup 1 versus Setups 2 and 3. Also, one can see initial tests show the overall light output to be comparable between Setups 2 and 3 when operating near a junction temperature of 80° C.—which does not make a case for pursuing Setup 2 (the bolt-on method) as it is more labor intensive than MIG welding when one considers having to bend the fin, apply thermal interface material (here, model 3500LV gap filler available from The Berquist Company, Chanhassen, Minn., USA), and bolt the fin; is subject to greater incongruities (e.g., in attempting to produce a consistent 90° "L" joint for each fin), and introduces a junction (e.g., between fin and substrate at the bolt hole) for possible corrosion or moisture ingress.

So removing Setup 1 (die cast with aspect ratio limitation) and Setup 2 (labor-intensive mechanical joining), one can look at how aspect ratio and fin characteristics can be modified to impact thermal transfer in MIG welded samples.

TABLE 1

| Setup | Base Area (sq. in) | Fin Alloy (Al) | Base Alloy (Al) | Fins (#) | D (in) | H (in) | X (in) | T (in) | Current (A) | Max Ts (° C.) | Max Tj (° C.) | Efficacy (lm/W) | Fixture lumens (lm) |
|---|---|---|---|---|---|---|---|---|---|---|---|---|---|
| 1 | 240 | 413 | 413 | 27 | 0.5 | 2.019^ | 0.88 | 0.268* | 0.6 | 68.0 | 72.3 | 170 | 83,181 |
| 1 | 240 | 413 | 413 | 27 | 0.5 | 2.019^ | 0.88 | 0.268* | 0.7 | 75.3 | 80.3 | 164 | 94,045 |
| 1 | 240 | 413 | 413 | 27 | 0.5 | 2.019^ | 0.88 | 0.268* | 0.8 | 82.2 | 88.0 | 158 | 104,194 |
| 2 | 336 | 1100 | 5052 | 42 | 0.5 | 8 | 0.53 | 0.08 | 1.2 | 69.7 | 78.7 | 145 | 150,124 |
| 2 | 336 | 1100 | 5052 | 42 | 0.5 | 8 | 0.53 | 0.08 | 1.3 | 73.6 | 83.4 | 141 | 158,829 |
| 2 | 336 | 1100 | 5052 | 42 | 0.5 | 8 | 0.53 | 0.08 | 1.4 | 77.6 | 88.2 | 137 | 167,005 |
| 3 | 288 | 1100 | 6061 | 50 | 0.5 | 8 | 0.4375 | 0.08 | 1.0 | 62.9 | 70.3 | 155 | 132,071 |
| 3 | 288 | 1100 | 6061 | 50 | 0.5 | 8 | 0.4375 | 0.08 | 1.2 | 70.8 | 79.8 | 146 | 151,131 |
| 3 | 288 | 1100 | 6061 | 50 | 0.5 | 8 | 0.4375 | 0.08 | 1.4 | 78.4 | 89.0 | 138 | 168,285 |

Figure 8:
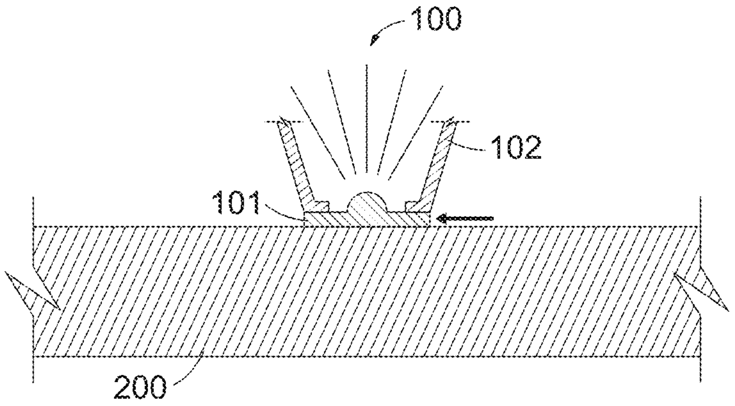
FIG. 8 illustrates (via arrow) the general location where temperature measurements were taken with respect to test data reported herein.

^Because of draft needed in castings, reported H is an average of the largest and smallest measurements
*Because of draft needed in castings, reported T is an average of the largest and smallest measurements With respect to the data reported in Table 1, $T_s$ was measured at 16 different locations across each test setup, each measurement made at an LED 101 with associated optic 102 at a point in accordance with standard practices; this is shown diagrammatically by the arrow of FIG. 8. As is well known in the art, junction temperature ($T_j$) cannot be readily measured directly; rather, it is derived from the solder point measurement ($T_s$) according to the following Equation 1. Efficacy and fixture lumens were calculated based on power measurements during testing, in combination with flux data published by the manufacturer (here, Cree) for the specific model of LED (here, XM-L2).

$$T_j = T_s + (\Theta * P) \quad \text{Equation 1}$$

Table 2 illustrates the difference between fin characteristics when operating 20 LEDs (model XP-L available from Cree, Inc., Durham, N.C., USA) near a junction temperature of 80.0 on a substrate measuring 14"×4"×0.5"; Setups 4-8 were all MIG welded (see FIG. 7A)—though Setups 9 and 10 used press fit fins (see FIG. 7D)—and all test setups used an Al 6061 base with Al 1100 fins. Again, all dimensions are reported with respect to FIG. 5, $T_s$ is solder point temperature, and $T_j$ is junction temperature, though it should be noted that because of the low LED count and small substrate size temperature was only measured in 7 locations on each test setup.

TABLE 2

| Setup | Feature | Fins (#) | H (in) | X (in) | T (in) | Current (A) | Max Ts (° C.) | Max Tj (° C.) | Efficacy (lm/W) | Fixture lumens (lm) |
|---|---|---|---|---|---|---|---|---|---|---|
| 4 | baseline condition | 10 | 5 | 0.38 | 0.08 | 1.6 | 70.3 | 81.2 | 133 | 13,173 |
| 4 | baseline condition | 10 | 5 | 0.38 | 0.08 | 1.7 | 73.3 | 84.9 | 130 | 13,700 |
| 4 | baseline condition | 10 | 5 | 0.38 | 0.08 | 1.8 | 76.1 | 88.5 | 126 | 14,208 |
| 5 | Setup 4 w/drilled holes | 10 | 5 | 0.38 | 0.08 | 1.6 | 70.7 | 81.5 | 133 | 13,162 |
| 5 | Setup 4 w/drilled holes | 10 | 5 | 0.38 | 0.08 | 1.7 | 73.6 | 85.2 | 130 | 13,692 |
| 6 | short fins | 8 | 3 | 0.50 | 0.08 | 1.5 | 71.4 | 81.6 | 135 | 12,498 |
| 6 | short fins | 8 | 3 | 0.50 | 0.08 | 1.6 | 74.4 | 85.3 | 132 | 13,049 |
| 7 | short, serrated fins | 8 | 2.8 | 0.50 | 0.08 | 1.5 | 73.8 | 83.9 | 135 | 12,431 |
| 7 | short, serrated fins | 8 | 2.8 | 0.50 | 0.08 | 1.6 | 77.0 | 87.9 | 132 | 12,973 |
| 8 | long fins | 7 | 8 | 0.56 | 0.08 | 1.5 | 63.1 | 73.3 | 138 | 12,732 |
| 8 | long fins | 7 | 8 | 0.56 | 0.08 | 1.6 | 65.6 | 76.5 | 134 | 13,311 |
| 8 | long fins | 7 | 8 | 0.56 | 0.08 | 1.8 | 70.7 | 83.1 | 127 | 14,381 |
| 9 | press fit | 8 | 5 | 0.50 | 0.08 | 1.6 | 68.5 | 79.4 | 133 | 13,225 |
| 9 | press fit | 8 | 5 | 0.50 | 0.08 | 1.7 | 71.4 | 83.0 | 130 | 13,760 |
| 10 | press fit - long fins | 7 | 8 | 0.56 | 0.08 | 1.6 | 65.1 | 76.0 | 134 | 13,325 |
| 10 | press fit - long fins | 7 | 8 | 0.56 | 0.08 | 1.8 | 70.3 | 82.7 | 128 | 14,397 |

As with Table 1, Table 2 highlights a few things. Again there is a decrease in efficacy yet an increase in fixture lumens when junction temperature increases. Also, it can be seen that attempts to modify the heat sink fins to permit extra air flow—in Setup 5 by drilling many dozens of 3⁄16" holes in the fin and in Setup 7 by creating serrations along the length of the heat fin—did not dramatically impact efficacy or fixture lumens when targeting a junction temperature ($T_a$) of 80° C. Lastly, press fit heat sink fins did not perform as poorly as one may have expected (likely because the overlap between protrusions and fins counteracted any negative impact to thermal transfer from an air gap), but certainly did not perform so well as to justify the extra machining time and material needed to create the small protrusions between which the fins would be pressed (see again FIG. 7D), introducing production incongruities because of tolerancing mismatch, or having to produce end welds.

So it can be seen that with respect to the forming/joining methods tested, MIG welding heat sink fins directly to the base is an adequate choice when one considers such things as rapidity, consistency, and cost-effectiveness—though hand-MIG welding is not, in and of itself, particularly rapid, consistent, or cost effective. For example, consider FIG. 10 of aforementioned provisional U.S. application Ser. No. 62/289,721 which illustrates a perspective view of an Al 6063 base to which Al 1100 fins have been hand-MIG welded. As can be seen, there is not much consistency between fins in terms of how flush they are with the substrate—which impacts thermal transfer. Also as can be seen, a limitation of hand-MIG welding is such that a gap is left at the end of each fin (shown in aforementioned FIG. 10 by a red arrow)—this creates a crevice which could act as a focal point for structure failure or corrosion, for example. Also, penetration remains an issue. Even in indoor or non-corrosive environments a lack of full penetration at the weld joint leads to a structurally and thermally inferior joint. As such, MIG welding was explored using a robotic arm—in an attempt to address consistency, thermal transfer, and structural integrity.

FIG. 11A of aforementioned provisional U.S. application Ser. No. 62/289,721 illustrates a first attempt at robot-MIG welding; note that feeder wire (here, Al 4043) was machined away (see the red dotted line) so to more clearly evaluate penetration. FIG. 11B of aforementioned provisional U.S. application Ser. No. 62/289,721 illustrates another attempt at robot-MIG welding with refined steps; note that feeder wire (here, Al 4043) is present. In both cases an Al 1100 fin was bonded to an Al 6063 base. As can be seen, despite the fact that the heat sink fins are a few thousandths of an inch thick, virtually no penetration is provided into the depth of the fin during initial attempts at robot-MIG welding—creating a crevice which could act as a focal point for structural failure or corrosion, for example. After refining processing steps a significant improvement to penetration was realized; initial tests show a final penetration on the order of 70% penetration through the thickness of the fin. FIG. 11B of aforementioned provisional U.S. application Ser. No. 62/289,721 was produced with a model FD-V6 arc welding robot, model FD11 robot controller, model WB-P400 power supply, and model WTA300-MUT torch—all available from OTC Daihen, Tipp City, Ohio, USA—at a speed varying from 40 in/min to 45 in/min and a current varying from 150 A to 200 A across the part (though power is also a relevant metric), and under an argon shield gas.

Figure 12:
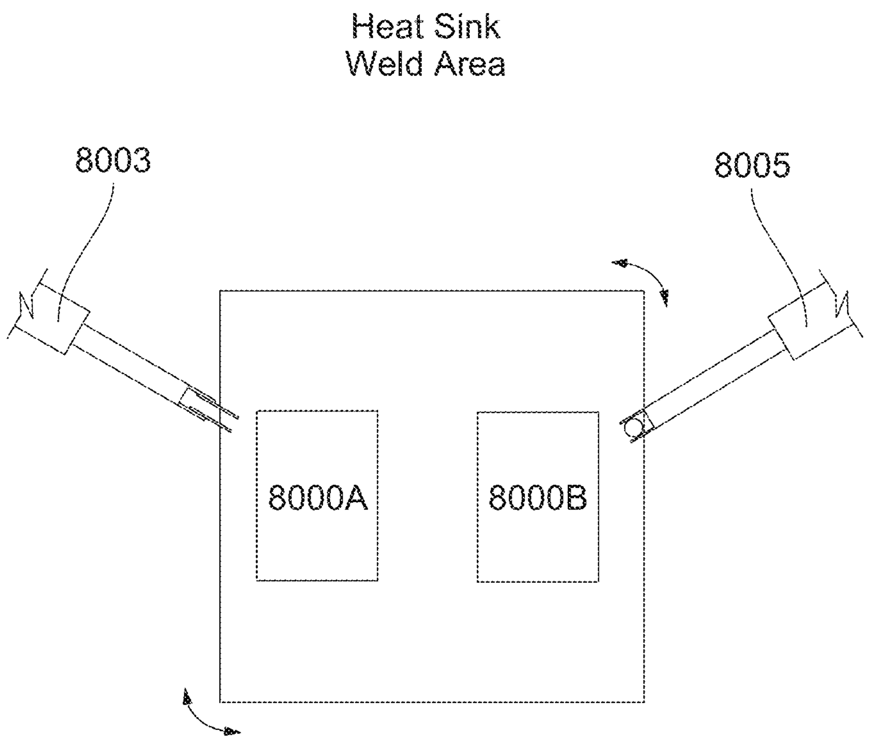
FIG. 12 illustrates one possible version of the heat sink weld area of FIG. 11.

So robotic-MIG welding certainly improves issues of full penetration, as well as consistency and rapidity, over other joining/forming methods already discussed—and is certainly an envisioned joining/forming method according aspects of the present invention—but a critical issue arose with both hand- and robotic-MIG welding that has not yet been discussed; namely, warpage of base 200 due to a combination of the slow weld speed, heat, and large weld zone associated with MIG welding. Initial attempts at MIG welding fins to a base at a production scale—namely, 53 Al 1100 fins to a base on the order of 12"×24"—resulted in warpage of the base; specifically, the ends of the base deflected upward (i.e., bowed towards the fins) on the order of ½". This was seen repeatedly regardless of the shape of the base (rectangle versus round) and regardless of the base material (Al 5052, Al 6061, or Al 6063), though it varied based on weld speed, torch angle, distance between torch and part, and bead size. As such, a jig was devised to pre-stress the base plate; said jig is illustrated in FIG. 12 of aforementioned provisional U.S. application Ser. No. 62/289,721. In essence, a plate was bent and held by clamps before welding fins thereto. Afterward, the base was released from the jig. Initial tests with the jig showed a reduction in warpage of the base from ½" deflection down to 1⁄16". So while the jig did address the issue of warpage somewhat, it introduced another labor intensive step in the overall process of creating an adequate heat sink for LED lighting fixtures in high demand lighting applications—and did not address rapidity. Robotic-MIG welded lighting fixture such as that described above could be fully welded in a matter of 30-to-35 minutes; a comparable amount of time compared to hand-MIG welding. It is of note that deflection was in some cases further reduced by inverting the base (i.e., placing the bowed base with welded fins in the opposite position to that of FIG. 4) and compressing the base with welded fins to "straighten out" the base—here using an anvil having a 100 inch radius and a force varying between 2 and 4 tons. This additional step is not accounted for in the above 30-to-35 minute timeframe and further reduces the feasibility of this approach with respect to rapidity.

So the issue, then, is how to produce a heat sink with thermal properties, penetration, consistency, and rapidity at least on par with robotic-MIG welding, and in a manner that minimizes the warpage issue at the base. A specific exemplary embodiment, utilizing aspects of the generalized examples described above to address the issues identified, will now be described.

B. Exemplary Method and Apparatus Embodiment 1

Laser welding is not a new technology—laser devices themselves have long been used for precision cutting of parts and micromachining (e.g., abrading surfaces), and have more recently been used for spot welding and joining of metal parts (predominately steels and titanium alloys) in the medical, aerospace, and automotive industries. Laser welding is faster than MIG welding (hand or robotic)—initial tests show almost six times as fast—and the intense heat is more localized—initial tests shown a weld zone approximately half as large as in MIG samples. This smaller weld zone, in combination with the small beam size and wide range of articulation (e.g., via robotic arm), shows promise for use in welding high aspect ratio heat sink fins insomuch that it may permit a much steeper weld angle (see FIG. 7A).

Of course, as has already been discussed and is presented in the aforementioned incorporated papers, laser welding 6xxx Al is problematic—and to date has not yet been attempted for high demand lighting fixture heat sinks using such alloys. Indeed, initial tests showed cracking when attempting to weld 6xxx Al fins to 6xxx Al bases. Full penetration with no cracking was eventually achievable when joining Al 1100 fins to an Al 5052 base (with no feeder wire), but as is discussed herein and illustrated in FIGS. 14A-E (which is an enlarged reproduction of FIG. 18 of aforementioned provisional U.S. application Ser. No. 62/289,721), Al 5052 is simply not thermally conductive enough to produce an adequate heat sink.

Ultimately, a number of deviations were made from initial settings one may see in the aforementioned established fields of laser welding or from initial materials one may see in traditional lighting fixture manufacturing in accordance with aspects of the present invention. Firstly, the base material was changed to Al 6063 and the fin material was changed to Al 1100—there is some compromise on thermal conductivity (see again FIG. 14A-E), but less than if one were to use Al 5052 material. Secondly, laser power was reduced so to melt less of the base material in an attempt to minimize cracking issues. Lastly, a wire material was used to improve flow properties at the weld zone and aid in achieving full penetration. Feeder wire first started as Al 4043 (see FIG. 13 of aforementioned provisional U.S. application Ser. No. 62/289,721), which resulted in a laser welded sample which performed comparably to the MIG welded samples of Tables 1 and 2 (see FIG. 14 of aforementioned provisional U.S. application Ser. No. 62/289,721 which has been enlarged and reproduced in FIGS. 10A-C). Al 4047 feeder wire is also possible (taking into consideration cost and availability) so to produce a more aesthetically pleasing weld (as it contains more silicon and better flow properties than Al 4043).

Reduced warping of the base was seen with laser welding as compared to the other methods already described, as well as standard laser welding practices; this is likely due to the decreased exposure time and minimized weld zone in accordance with the changes above. This reduced warpage permitted either (i) omission of the post-weld bending previously described (i.e., where the welded base was inverted and bent against the direction of deflection after welding) or (ii) inclusion of the post-weld bending with a tighter tolerance. Taking the latter approach, after post-weld bending only 1 out of 100 bases was determined to be out of tolerance after all fins (in this example, 50 fins) were laser welded; here, "out of tolerance" was defined as base deflection exceeding 0.02" for a base thickness of 0.5" (as compared to 1/16" deflection with MIG welding even when including pre-stressing), though tolerances could be defined other ways according to aspects of the present invention. Additional means and methods of salvaging or otherwise bringing into compliance the few welded bases which were out of tolerance is later discussed.

Figure 9:
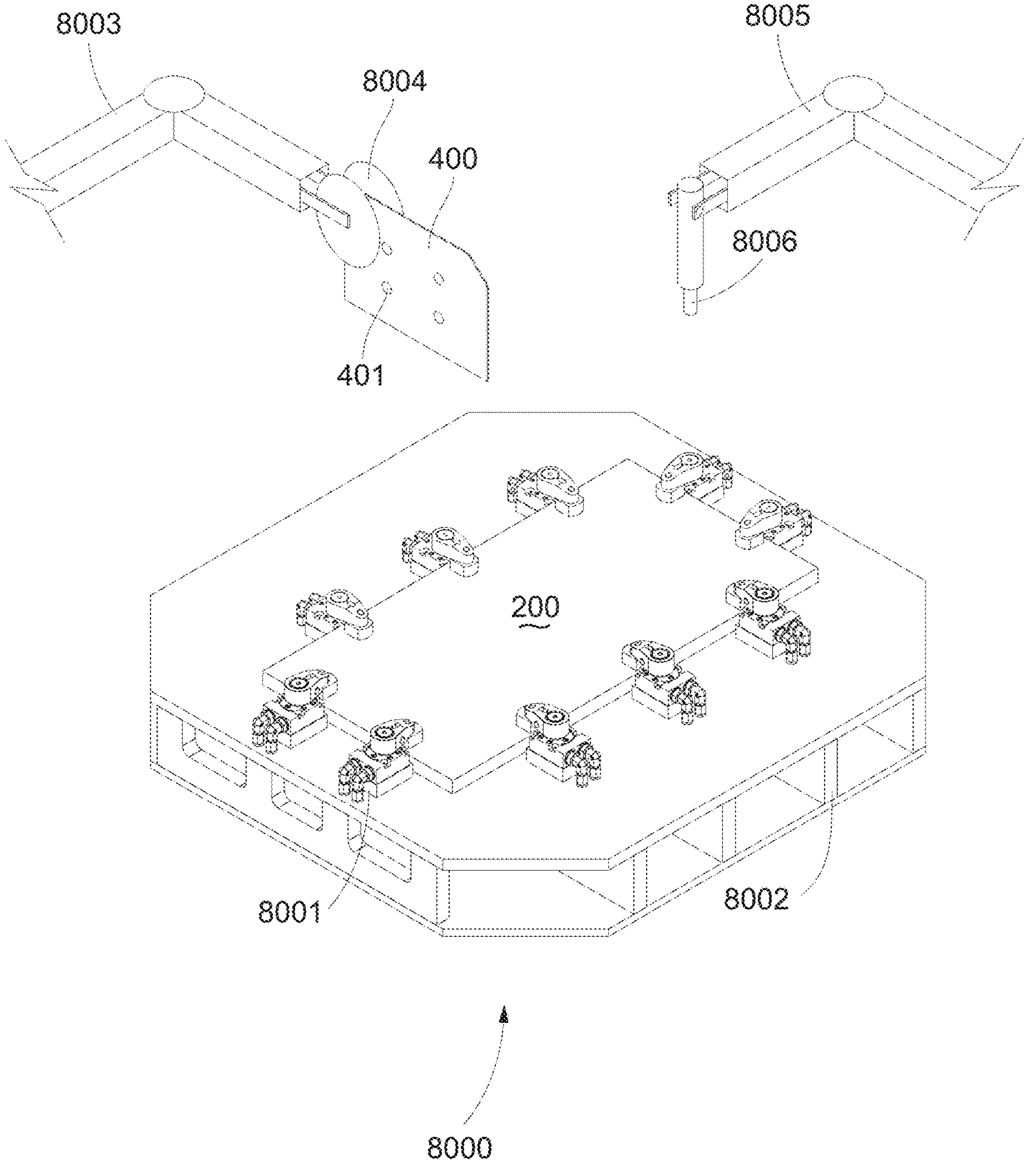
FIG. 9 illustrates one possible jig for positioning a base relative one or more automated or robotic devices adapted to position and weld heat sink fins.

Given such promising results, the base was not pre-stressed as in the MIG welding case of FIG. 12 of aforementioned provisional U.S. application Ser. No. 62/289,721, which permitted a simplified jig 8000 (FIG. 9) which generally comprises a lower base 8002 to which base 200 is pneumatically clamped 8001; clamp hold-down force is sufficient to prevent lateral movement during welding but does not pre-stress the part (e.g., on the order of 380 N*m torque). In practice, a first robotic arm having suction cups 8004 (e.g., pneumatically operated) grip a fin 400 and place it in a correct orientation and position on base 200 as determined by servo control; servo controlled welding systems are well known in the art. A second robotic arm having a laser and feeder wire 8006 welds the gripped and placed fin 400 relative base 200. Robot 8003 could, for example, be one of the many models available from OTC Daihen, Tipp City, Ohio, USA whereas robot 8005 could be the same or similar model available from OTC Daihen coupled with one of the many models of laser available from IPG Photonics Corporation, Oxford, Mass., USA (with associated wire feeder and shield gas attachments, if needed), or otherwise.

Figure 11:
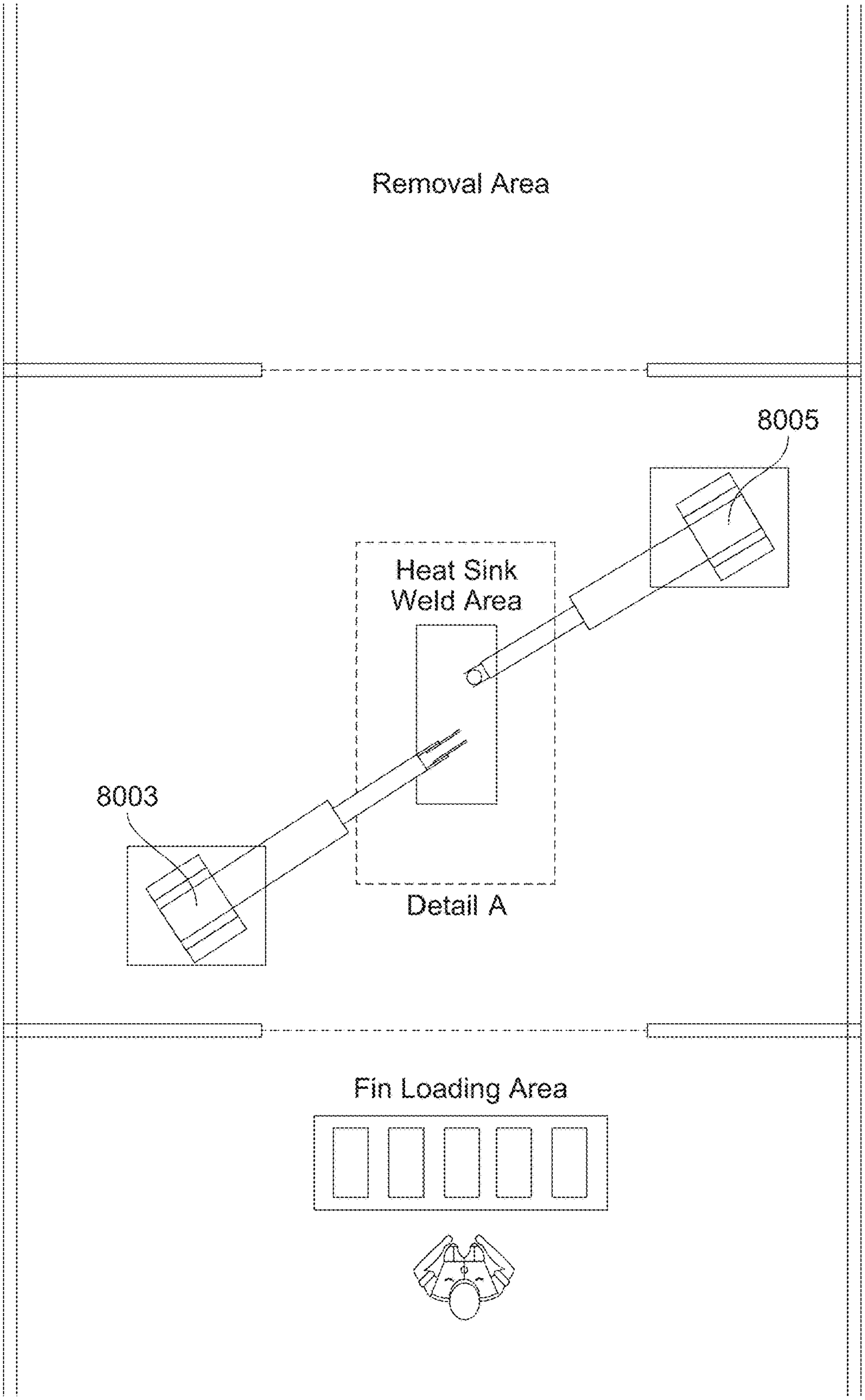
FIG. 11 illustrates one example of an automated assembly station according to aspects of the present invention.
Figure 13:
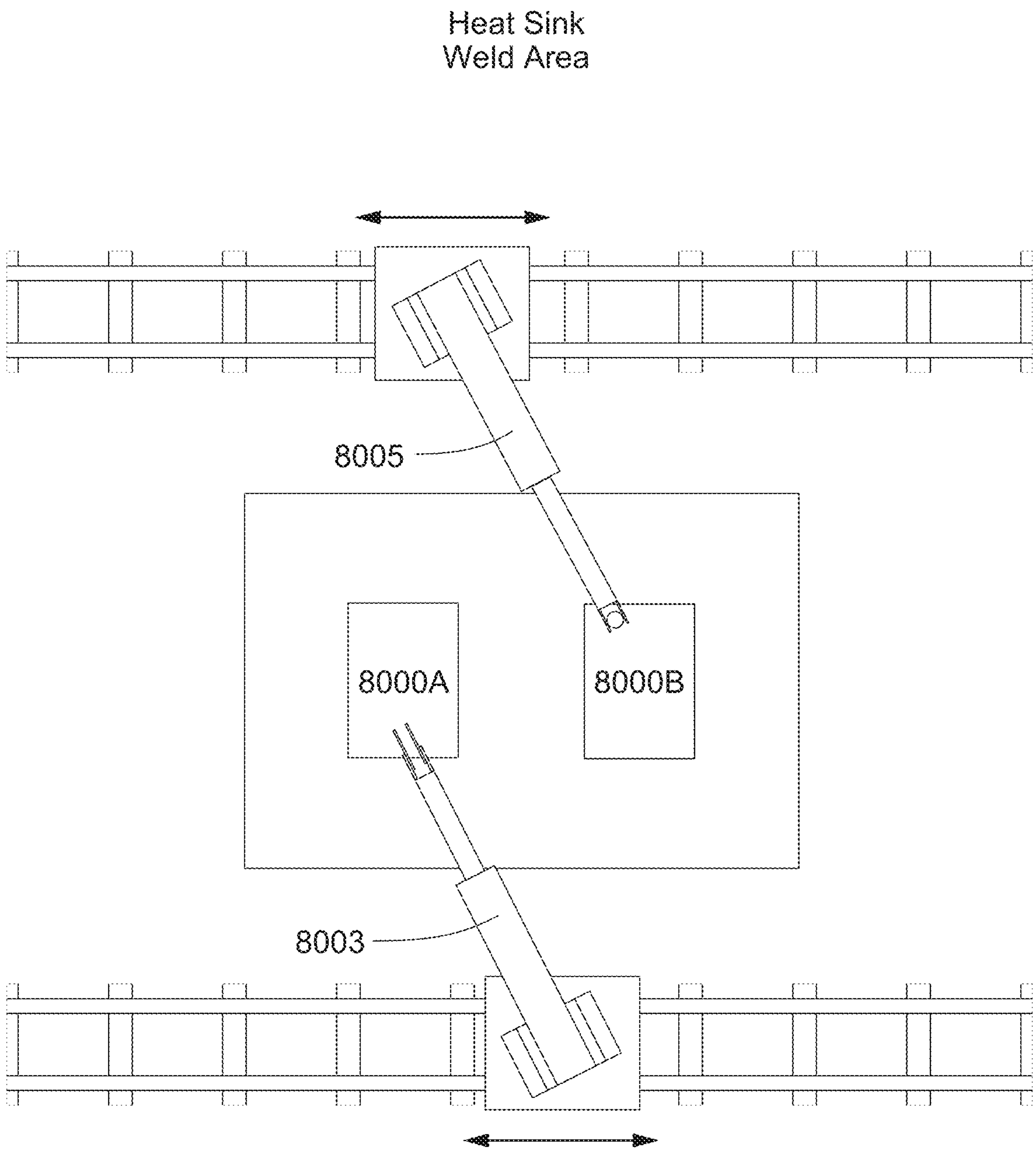
FIG. 13 illustrates another possible version of the heat sink weld area of FIG. 11.
Figure 14C:
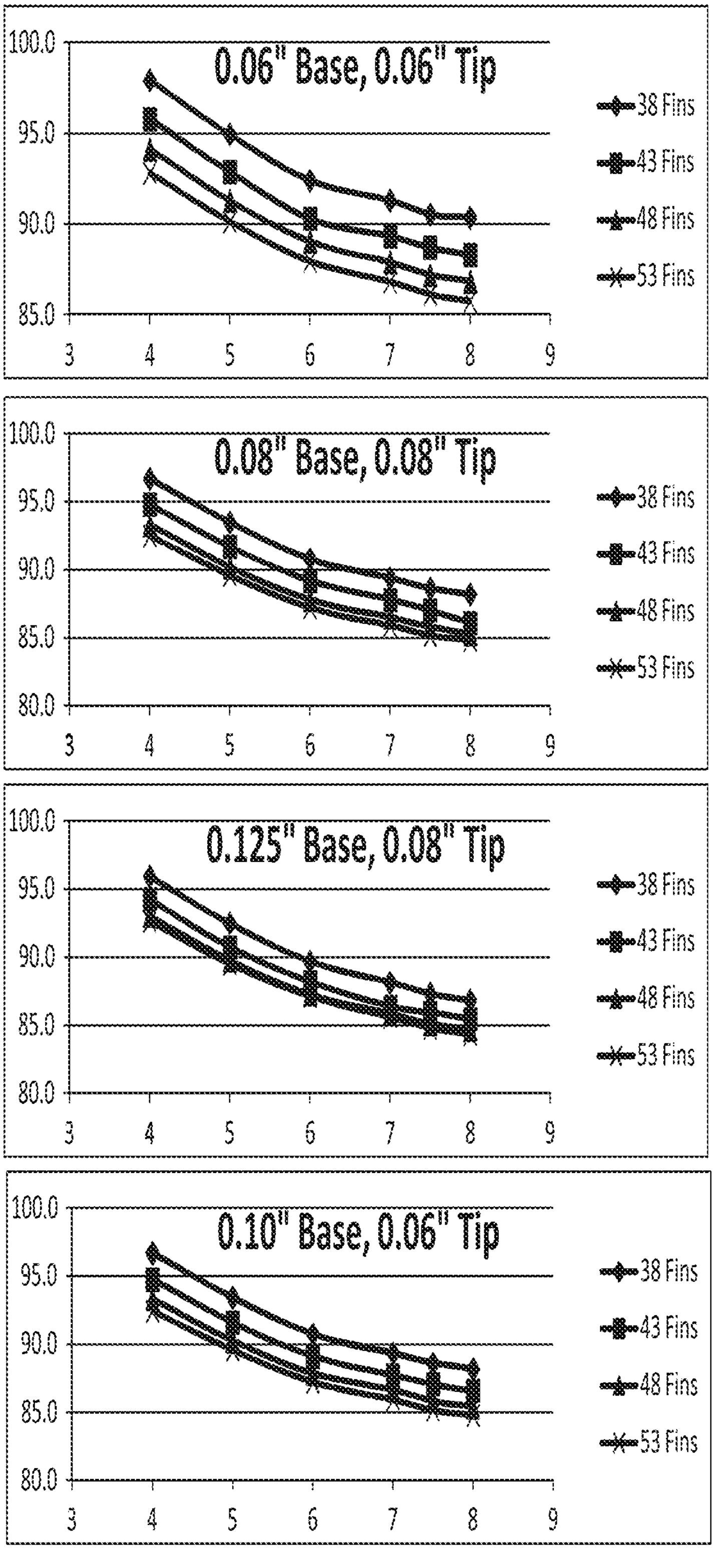
Figure 14E:
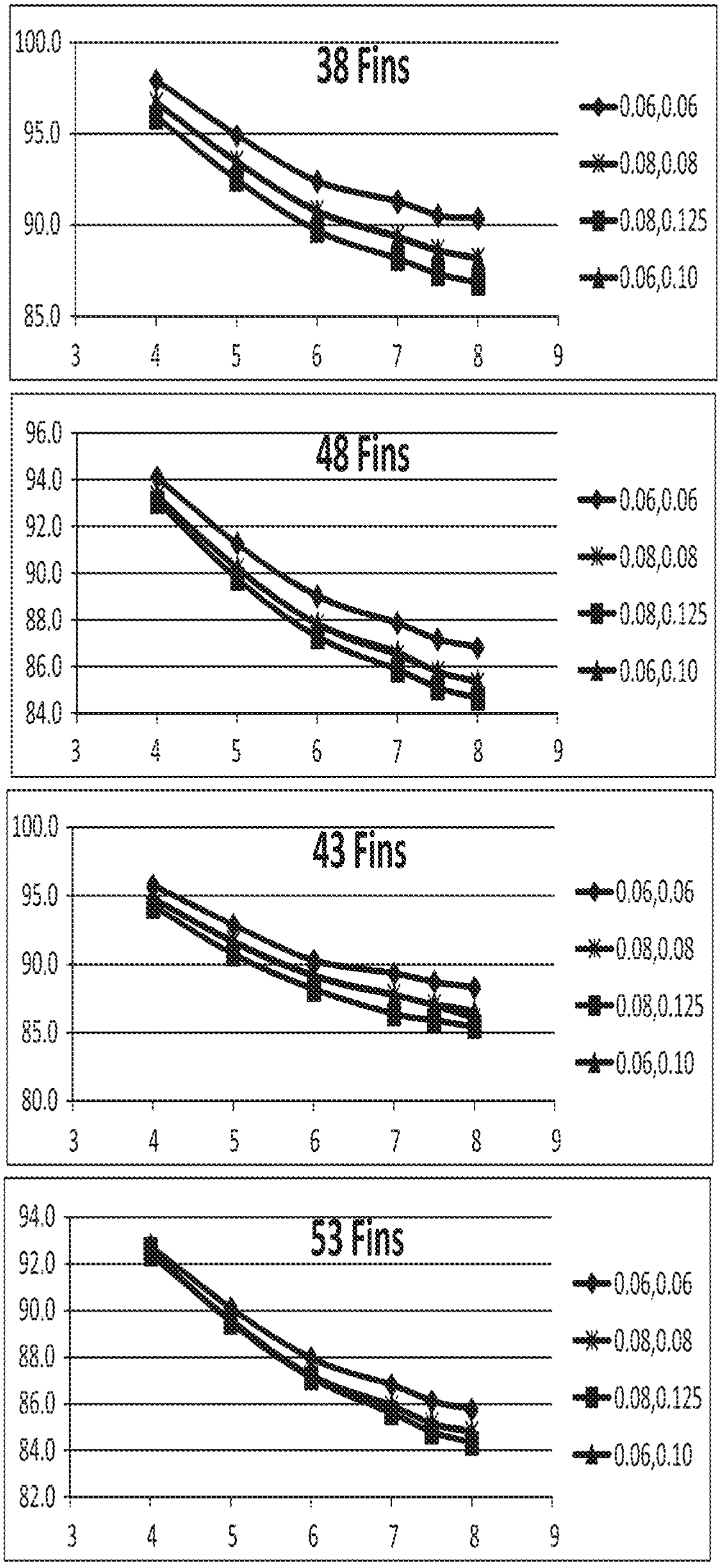

Of course, there are other concerns in operating lasers; specifically, in preserving safety and ensuring cost effectiveness by maximizing duty cycle in a production setting. FIGS. 11-13 illustrate a few different approaches according to aspects of the present invention to address these concerns. A three-chambered cell is envisioned in which personnel can access a fin loading area as well as remove finished fixtures from a removal area while the central chamber is in operation; in practice this would likely require inner and outer doors for both the fin loading and removal areas (though only inner doors are illustrated via dotted line in FIG. 11), the inner doors actively monitored (e.g., via sensors) to ensure lasers were only operating when said inner doors are closed—thereby ensuring safety. Within the central chamber, robot 8003 grips a fin 400 and then robot 8005 laser welds it in place on a positioned base 200 in jig 8000; in practice, it has been found stamping or otherwise semi-perforating fins 400 to include dimples 401 (FIG. 9) is needed to avoid multiple stacked fins sticking to one another. Said dimples 401 are easily introduced during the overall stamping process of high aspect ratio fins 400 (they are not through-holes), do not impact thermal transfer, and do not impede air flow. Robot 8003 places a second fin, robot 8005 welds said second fin, and so on. Within the innermost portion of the central chamber (i.e., the heat sink weld area), duty cycle can be further maximized by introducing a turntable rather than a stationary table (FIG. 12). In this manner a finished fixture (here on a jig 8000A) could be lifted and moved to the removal area by a third robot (not illustrated) while robots 8003/8005 continue to work on base 200 of jig 8000B. FIG. 13 illustrates an alternative heat sink weld area wherein robots 8003/8005 are mounted to a surface having means to travel back and forth along a track (e.g., via handcar automated by the robot controller)—which could permit a third and fourth robot (not illustrated) in the center space between tracks to place jigs and remove finished fixtures, respectively. As may be appreciated, the scale of FIG. 13 could be greatly expanded such that multiple jigs 8000 could exist along an assembly line—though, of course, there is a practical limitation as to how large an area can be sealed off during laser operation within any given facility.

Figure 16:
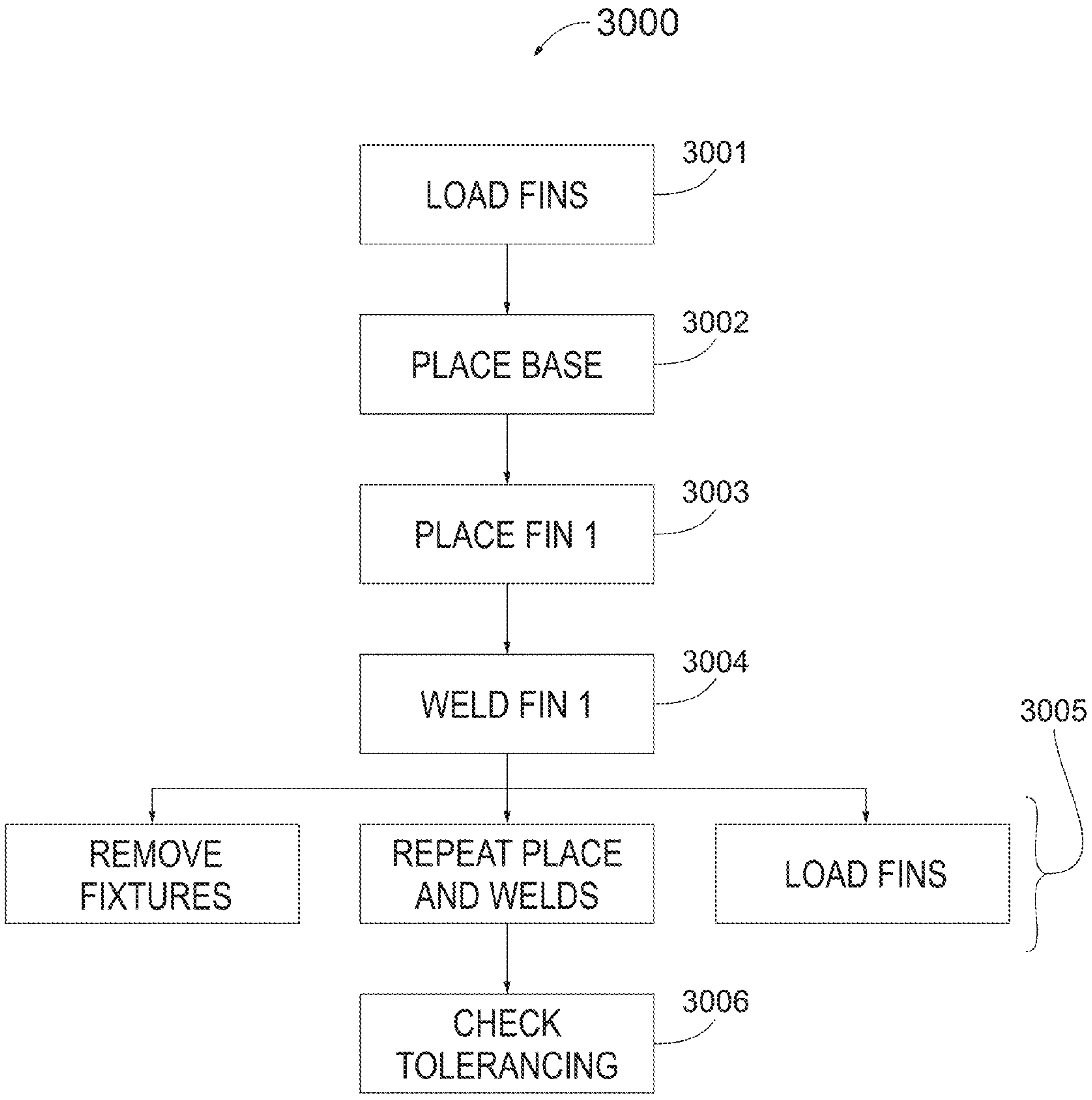
FIG. 16 illustrates one possible manufacturing/assembly method according to aspects of the present invention.

The goal is to keep robots 8003/8005 moving in a flexible and adjustable manner (so to accommodate different sizes and configurations of heat sinks) without exposing persons to a hazardous condition and without significant downtime. A method 3000 for achieving such is illustrated in FIG. 16 and flow thusly: a first step 3001 comprises loading fins 400 (e.g., in the aforementioned fin loading area); a second step 3002 comprises placing base 200 (e.g., in jig 8000) in a known position such that a first fin can be placed in a precise location and orientation relative base 200 (step 3003); said first fin is then welded (step 3004) while a second fins is simultaneously being gripped and placed. Depending on how many robots are available (or persons if relying upon a semi-automatic setup), number of times method 3000 has been executed, etc., step 3005 may comprise continuing to place and weld fins, loading more fins (e.g., into the fin loading area), removing finished fixtures (e.g., from the aforementioned removal area), or all three (or some subset thereof) simultaneously. A final step 3006 comprises checking tolerancing of finished fixtures (e.g., by simple measurement of deflection of base 200); though it should be noted that final step 3006 could be optional given the much tighter tolerancing of laser welding as compared to other methods. If a fixture is found to be out of tolerance it could be scrapped, base 200 manually ground down so to reduce deflection, put into operation even while out-of-tolerance, or placed back in jig 8000 and compressed to try and counteract the deflection by bending base 200 in the opposite direction of deflection in the manner already described; of course, one must be careful not to bend the already welded fins in such an approach.

Ultimately, the combination of deviations from conventional wisdom, apparatus, and methods described herein results in a heat sink manufacturing technique which, compared to standard techniques, is more rapid (producing roughly 10 fixtures with 50 fins each per hour) and more consistent (producing only a single fixture out of tolerance for every 100 fixtures welded)—and provides full penetration using effective heat sink alloys (thereby preserving efficient thermal dissipation paths).

C. Options and Alternatives

The invention may take many forms and embodiments. The foregoing examples are but a few of those. To give some sense of some options and alternatives, a few examples are given below.

Discussion has been given herein to high demand lighting applications; namely, applications that require driving LEDs near or past their manufacturer-recommended operating conditions. Discussion has been given herein as to why one may drive LEDs near or past their rated or recommended maximum drive current, maximum power, or maximum junction temperature; namely, to achieve a total light output, a number of operating hours, and/or to offset the high capital cost of LEDs versus traditional sources. It should be noted that aspects according to the present invention could be applied to any lighting fixture which requires a heat sink including one or more heat sink fins—not just LEDs, not just high demand lighting applications, and not just for purposes of driving the light source harder. For example, one may simply want an existing LED fixture to run cooler and therefore, at a higher efficacy. As another example, one may simply want to extend the life of temperature sensitive components and therefore, save money. As another example, one may simply desire a cost-effective and consistent method of constructing light fixture housings (regardless of any thermal considerations), and so may benefit from aspects of the present invention. Finally, one may simply want to avoid the long lead times and high tooling costs associated with casting components; a particularly strong need in the art of LED lighting design as the ever-increasing quality of LEDs is outpacing the ability to design (and produce) lighting fixtures to house them. The motivation for why one may need a more adequate heat sink could differ from those stated herein and not depart from at least some aspects of the present invention.

The flexibility of implementing a robotic-driven joining method of heat sink fins to a base or substrate has been discussed, particularly in the context of accommodating rapid changes in fixture design (unlike what is possible with casting or hard tooling associated with other forming methods). This flexibility could be realized using other forming methods. For example, the press fit fin approach did show some promise in the area of adequate thermal transfer—a main limitation was the inability to meet tolerances and provide an end weld to prevent moisture ingress. A flexible robotic welding system—MIG or laser—could provide said end welds in a rapid and consistent manner (e.g., via simple robot controller programming in combination with a camera or positioning system). While such may not address the tolerancing issue with press fit fins, it is illustrative of flexibility in the system as designed; and if tolerances improve, could be used with press fit fins in a production setting.

Figure 15:
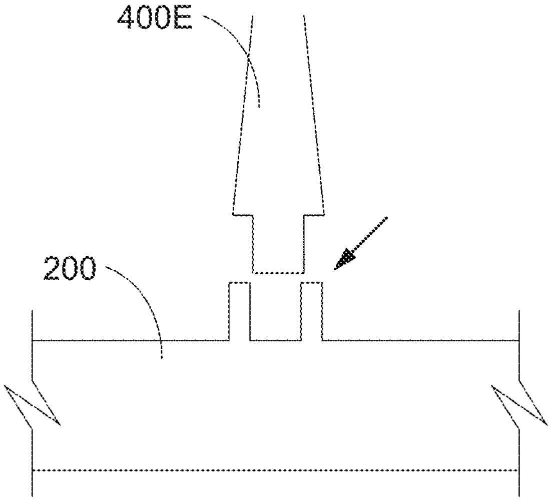
FIG. 15 illustrates an alternative fin design according to aspects of the present invention.

Lastly, a number of different fins and a number of different materials have been illustrated, tested, and discussed herein; these are not all-inclusive. There are, of course, other thermally conductive materials beyond those reported in FIG. 14A-E; for example, silver and silver alloys. There are other designs of heat sink fins beyond those illustrated in FIGS. 6A-7D; for example, fins 400E with a thick base which are keyed to the slots formed by protrusions in the base (see FIG. 15). Lighting fixture designs could differ from those described herein; for example, a round base (see reference no. 200) including a thermal interface paste between said base and the thermal transfer side of the LEDs. Heat sink fins in the fin loading area could be of a variety of shapes, sizes, thicknesses, and aspect ratios. A variety of materials and designs could be embodied in lighting fixture heat sink manufacturing according to aspects of the present invention.

What is claimed is:

1. A method of producing a heat sink for a lighting fixture comprising:

a. assigning mounting positions for heat sink fins relative a heat sink base in thermal contact with one or more light sources of the lighting fixture, said mounting positions including orientation of the heat sink fins relative said heat sink base;

b. programming a first robot to retrieve a heat sink fin and position it in an assigned mounting position at a selected orientation;

c. programming a second robot to weld the retrieved, positioned, and oriented heat sink fin to the heat sink base;

d. repeating steps a-c for a plurality of heat sink fins until an adequate heat sink is produced, where adequate is defined as a desired number of heat sink fins welded to a heat sink base for a given set of operating conditions.

2. The method of claim 1 where one or more heat sink fins may vary according to:

a. aspect ratio;

b. shape; or c. material.

3. The method of claim 1 wherein the step of retrieving a heat sink fin comprises retrieving a heat sink fin from a plurality of sorted and stacked heat sink fins.

4. The method of claim 1 wherein the given set of operating conditions is defined, at least in part, by thermal conductivity of the heat sink fins and heat sink base.

5. The method of claim 1 wherein the welding is laser welding.

6. The method of claim 1 wherein the heat sink base is removably clamped in place during welding to prevent lateral movement.

7. The method of claim 1 further comprising the step of testing the deflection of the heat sink base of the produced heat sink.

8. The method of claim 1 further comprising a heat sink fin loading station and a welding station, and wherein the first and second robots are operated to alternate between (a) the first robot retrieving heat sink fins from the heat sink loading station and positioning said heat sink fins relative the heat sink base at the welding station and (b) the second robot welding said heat sink fins to the heat sink base.

9. The method of claim 1 applied to heat sink bases and heat sink fins of different metal alloy composition selected to promote full penetration welds between said fins and base when laser welded.

* * * * *